(12) United States Patent
Sugihara et al.

(10) Patent No.: US 10,089,863 B2
(45) Date of Patent: Oct. 2, 2018

(54) MANAGEMENT SYSTEM AND MANAGEMENT METHOD FOR MINING MACHINE

(71) Applicant: Komatsu Ltd., Tokyo (JP)

(72) Inventors: Motohide Sugihara, Fujisawa (JP); Koutarou Hori, Sagamihara (JP)

(73) Assignee: Komatsu Ltd., Tokyo (JP)

( * ) Notice: Subject to any disclaimer, the term of this patent is extended or adjusted under 35 U.S.C. 154(b) by 743 days.

(21) Appl. No.: 14/357,666

(22) PCT Filed: Aug. 30, 2013

(86) PCT No.: PCT/JP2013/073382
§ 371 (c)(1),
(2) Date: May 13, 2014

(87) PCT Pub. No.: WO2015/029229
PCT Pub. Date: Mar. 5, 2015

(65) Prior Publication Data
US 2016/0247395 A1    Aug. 25, 2016

(51) Int. Cl.
*G06F 19/00* (2018.01)
*G06G 7/70* (2006.01)
(Continued)

(52) U.S. Cl.
CPC ..... *G08G 1/0116* (2013.01); *G06Q 10/06393* (2013.01); *G06Q 50/02* (2013.01); *G07C 5/008* (2013.01); *G08G 1/20* (2013.01)

(58) Field of Classification Search
None
See application file for complete search history.

(56) References Cited

U.S. PATENT DOCUMENTS 6,909,947 B2 *  6/2005  Douros ............... G07C 5/0808
                                                     701/34.4
6,925,425 B2 *  8/2005  Remboski ........... G07C 5/0808
                                                     340/540
(Continued)

FOREIGN PATENT DOCUMENTS

CA    2815238 A1    5/2013
CN   103210414 A    7/2013
(Continued)

OTHER PUBLICATIONS

International Search Report and Written Opinion dated Nov. 5, 2013, issued for PCT/JP2013/073382.

*Primary Examiner* — Jean Paul Cass
(74) *Attorney, Agent, or Firm* — Locke Lord LLP

(57) ABSTRACT

A management system of the mining machine includes a position information detector which detects position information about the mining machine; an operation information detector detecting operation information about the mining machine; and a first evaluation device evaluating the operation information based on the position information and the operation information. A route in a mine includes nodes disposed at a predetermined distance and links connecting between the adjacent nodes, and includes route information including a specific section in which a difference in a gradient between the adjacent links is a predetermined value or less, a difference in an orientation between the adjacent links is a predetermined value or less, and no intersection exists between the adjacent links. The first evaluation device evaluates the operation information in the specific section of the route.

4 Claims, 19 Drawing Sheets

(51) Int. Cl.
*G06G 7/76* (2006.01)
*G08G 1/00* (2006.01)
*G08G 1/01* (2006.01)
*G06Q 50/02* (2012.01)
*G06Q 10/06* (2012.01)
*G07C 5/00* (2006.01)

(56) References Cited

U.S. PATENT DOCUMENTS

| | | | | |
|---|---|---|---|---|
| 6,977,630 B1* | 12/2005 | Donath | B60R 1/00 | 345/7 |
| 7,039,654 B1* | 5/2006 | Eder | G06Q 10/06 | |
| 7,426,499 B2* | 9/2008 | Eder | G06F 17/30867 | 706/20 |
| 7,565,230 B2* | 7/2009 | Gardner | G07C 5/0808 | 180/272 |
| 7,596,242 B2* | 9/2009 | Breed | G06K 9/00362 | 382/103 |
| 7,903,601 B2* | 3/2011 | Voglewede | H04J 3/0667 | 370/324 |
| 8,436,872 B2* | 5/2013 | Wright | G06T 17/05 | 345/633 |
| 8,521,411 B2* | 8/2013 | Grabowski | G01C 21/365 | 701/454 |
| 8,525,829 B2* | 9/2013 | Smithwick | G02B 27/2214 | 345/419 |
| 8,638,190 B1* | 1/2014 | Want | G06F 3/046 | 340/5.1 |
| 9,528,872 B2* | 12/2016 | Stevenson | G01F 23/14 | |
| 9,556,732 B2* | 1/2017 | Sugihara | G06Q 50/02 | |
| 9,734,641 B2* | 8/2017 | Yamamoto | G07C 5/0841 | |
| 2002/0091473 A1* | 7/2002 | Gardner | G07C 5/0808 | 701/32.7 |
| 2002/0116156 A1* | 8/2002 | Remboski | G07C 5/0808 | 702/188 |
| 2002/0120374 A1* | 8/2002 | Douros | G07C 5/0808 | 701/34.4 |
| 2004/0066376 A1* | 4/2004 | Donath | B60R 1/00 | 345/169 |
| 2004/0246144 A1* | 12/2004 | Siegel | G08G 1/087 | 340/902 |
| 2005/0136947 A1* | 6/2005 | Llombart-Juan | G01C 21/20 | 455/456.3 |
| 2005/0149251 A1* | 7/2005 | Donath | G01C 21/26 | 701/532 |
| 2005/0151941 A1* | 7/2005 | Solomon | G02B 27/017 | 353/122 |
| 2006/0061309 A1* | 3/2006 | Rudinec | B60L 11/1803 | 318/139 |
| 2007/0120834 A1* | 5/2007 | Boillot | G06F 3/016 | 345/173 |
| 2007/0125633 A1* | 6/2007 | Boillot | G06F 3/011 | 200/52 R |
| 2007/0126561 A1* | 6/2007 | Breed | B60K 28/066 | 340/426.13 |
| 2008/0024463 A1* | 1/2008 | Pryor | B60K 35/00 | 345/175 |
| 2009/0005961 A1* | 1/2009 | Grabowski | G01C 21/365 | 701/532 |
| 2009/0183157 A1* | 7/2009 | Tran | G06F 1/3203 | 718/100 |
| 2009/0191850 A1* | 7/2009 | Cardwell, III | G08B 25/016 | 455/412.2 |
| 2011/0022267 A1* | 1/2011 | Murphy | A01B 69/00 | 701/38 |
| 2011/0026664 A1* | 2/2011 | Castro Scorsi | G11C 19/00 | 377/54 |
| 2011/0102483 A1* | 5/2011 | Kanamori | G09G 3/002 | 345/690 |
| 2011/0187559 A1* | 8/2011 | Applebaum | B60Q 1/00 | 340/907 |
| 2012/0200404 A1* | 8/2012 | Morris | G08G 1/164 | 340/438 |
| 2012/0200406 A1* | 8/2012 | Morris | B60K 35/00 | 340/439 |
| 2012/0209474 A1* | 8/2012 | Morris | B62D 1/046 | 701/42 |
| 2013/0120825 A1* | 5/2013 | Lambert | G02B 27/01 | 359/290 |
| 2013/0120850 A1* | 5/2013 | Lambert | G02B 27/0101 | 359/630 |
| 2013/0127980 A1* | 5/2013 | Haddick | G06F 3/013 | 348/14.08 |
| 2013/0278631 A1* | 10/2013 | Border | G02B 27/017 | 345/633 |
| 2014/0244098 A1 | 8/2014 | Ueda et al. | | |
| 2014/0306833 A1* | 10/2014 | Ricci | B60Q 1/00 | 340/901 |
| 2014/0309789 A1* | 10/2014 | Ricci | B60Q 1/00 | 700/276 |
| 2014/0310075 A1* | 10/2014 | Ricci | H04W 4/21 | 705/13 |
| 2014/0343802 A1* | 11/2014 | Pichlmaier | A01B 63/112 | 701/50 |
| 2015/0142258 A1* | 5/2015 | Sugihara | G06Q 50/02 | 701/32.3 |
| 2015/0211878 A1* | 7/2015 | Jiyama | G01C 21/365 | 701/439 |
| 2016/0253853 A1* | 9/2016 | Yamamoto | G07C 5/0841 | 701/50 |
| 2017/0043761 A1* | 2/2017 | Morisaki | B60W 50/0097 | |

FOREIGN PATENT DOCUMENTS

| | | | |
|---|---|---|---|
| JP | 2002-329285 A | | 11/2002 |
| JP | 2007-233122 A | | 9/2007 |
| JP | 2008-076593 A | | 4/2008 |
| JP | 2008076593 A | * | 4/2008 |
| JP | 2008-211697 A | | 9/2008 |
| JP | 2011-232870 A | | 11/2011 |
| JP | 2013-105278 A | | 5/2013 |
| JP | 2013105278 A | * | 5/2013 |

* cited by examiner

MANAGEMENT SYSTEM AND MANAGEMENT METHOD FOR MINING MACHINE

FIELD

The present invention relates to a management system and a management method for a mining machine.

BACKGROUND

In mining sites in a mine, mining machines such as a hydraulic excavator and a dump track operate. In these years, information about a mining machine is acquired via wireless communications. Patent Literature 1 discloses a technique in which the drive evaluation result of a machine is sent to a monitoring center via wireless communications.

CITATION LIST

Patent Literature

Patent Literature 1: Japanese Laid-open Patent Publication No. 2007-233122

SUMMARY

Technical Problem

In these years, it becomes important to manage the operations of mining machines in order to improve production efficiency in consideration of the productivity and economy of mining machines. To this end, it is necessary for a productivity manager and a vehicle manager to monitor what problem occurs on production efficiency in which site, on which traveling route, and on which mining machine in driving, for example. Therefore, it is desired that appropriate indices for determining the superiority of production efficiency be used to evaluate the operation of the mining machine for easily grasping problems on production efficiency and readily coping with the problems.

An object of the present invention is to provide a management system and a management method for a mining machine that can evaluate the operation of a mining machine using appropriate indices for determining the superiority of production efficiency.

Solution to Problem

According to the present invention, a management system of a mining machine comprises: a position information detector which is mounted on a mining machine enabled to travel on a route in a mine and detects position information about the mining machine; an operation information detector which is mounted on the mining machine and detects operation information about the mining machine; and a first evaluation device which evaluates the operation information based on the position information and the operation information, wherein the route in the mine includes a plurality of nodes disposed at a predetermined distance and a plurality of links connecting between the nodes adjacent to each other, and includes route information including a specific section in which a difference in a gradient between the links adjacent to each other is a predetermined value or less, a difference in an orientation between the links adjacent to each other is a predetermined value or less, and no intersection exists between the links adjacent to each other; and the first evaluation device evaluates the operation information in the specific section of the route.

In the present invention, the management system of a mining machine can comprise a first output device which outputs the operation information in association with the specific section.

In the present invention, the route can include a plurality of routes; and the first evaluation device can evaluate the operation information in the specific section of the plurality of routes.

In the present invention, the route can include a plurality of specific sections; and the management system can comprise a second evaluation device which evaluates an index of production efficiency of the mining machine including an amount of fuel consumed per unit time and a transport load per unit time of the mining machine in each of the plurality of specific sections.

In the present invention, the management system of a mining machine can comprise a second output device which outputs the index in association with each of the plurality of specific sections.

In the present invention, the second output device can output a two-dimensional graph in which one of the amount of fuel consumed per unit time and the transport load per unit time of the index is a vertical axis, the other is a horizontal axis, and a mean value of the indexes of the plurality of specific sections is an origin point; and the second output device can output a line indicating the transport load per unit amount of fuel consumed to be an evaluation reference and a point indicating the index of each of the plurality of specific sections to the two-dimensional graph.

In the present invention, the route can include a plurality of routes; and the management system can comprise a second evaluation device which evaluates an index of production efficiency of the mining machine including an amount of fuel consumed per unit time and a transport load per unit time of the mining machine in each of the plurality of routes.

In the present invention, the management system of a mining machine can comprise a second output device which outputs the index in association with each of the plurality of routes.

In the present invention, the second output device can output a two-dimensional graph in which one of the amount of fuel consumed per unit time and the transport load per unit time of the index is a vertical axis, the other is a horizontal axis, and a mean value of the indexes of the plurality of routes is an origin point; and the second output device can output a line indicating the transport load per unit amount of fuel consumed to be an evaluation reference and a point indicating the index of each of the plurality of routes to the two-dimensional graph.

In the present invention, the mining machine can include a plurality of mining machines; and the first evaluation device can evaluate the operation information in the specific section of the route on which each of the plurality of mining machines has traveled.

In the present invention, the management system of a mining machine can comprise a second evaluation device which evaluates an index of production efficiency including an amount of fuel consumed per unit time and a transport load per unit time of each of the plurality of mining machines.

In the present invention, the management system of a mining machine can comprise a second output device which outputs the index in association with each of the plurality of mining machines.

In the present invention, the second output device can output a two-dimensional graph in which one of the amount of fuel consumed per unit time and the transport load per unit time of the index is a vertical axis, the other is a horizontal axis, and a mean value of the indexes of the plurality of mining machines is an origin point; and the second output device can output a line indicating the transport load per unit amount of fuel consumed to be an evaluation reference and a point indicating the index of each of the plurality of mining machines to the two-dimensional graph.

In the present invention, the mining machine can operate in each of a plurality of work periods; and the first evaluation device can evaluate the operation information in the specific section in each of the plurality of work periods.

In the present invention, the management system of a mining machine can comprise a second evaluation device which evaluates an index of production efficiency of the mining machine including an amount of fuel consumed per unit time and a transport load per unit time of the mining machine in each of the plurality of work periods.

In the present invention, the management system of a mining machine can comprise a second output device which outputs the index in association with each of the plurality of work periods.

In the present invention, the second output device can output a two-dimensional graph in which one of the amount of fuel consumed per unit time and the transport load per unit time of the index is a vertical axis, the other is a horizontal axis, and a mean value of the indexes of the plurality of work periods is an origin point; and the second output device can output a line indicating the transport load per unit amount of fuel consumed to be an evaluation reference and a point indicating the index of each of the plurality of work periods to the two-dimensional graph.

According to the present invention, a management system of a mining machine comprises: a route in a mine including a plurality of nodes disposed at a predetermined distance and a plurality of links connecting between the nodes adjacent to each other, the route including route information including a specific section in which a difference in a gradient between the links adjacent to each other is a predetermined value or less, a difference in an orientation between the links adjacent to each other is a predetermined value or less, and no intersection exists between the links adjacent to each other, the route including a plurality of the specific sections; a position information detector which is mounted on a mining machine enabled to travel on the route in the mine and detects position information about the mining machine; an operation information detector which is mounted on the mining machine and detects operation information about the mining machine; and an output device which outputs an index of production efficiency of the mining machine including an amount of fuel consumed per unit time and a transport load per unit time of the mining machine in each of the plurality of specific sections in association with each of the plurality of the specific sections based on the position information and the operation information, wherein the output device outputs a two-dimensional graph in which one of the amount of fuel consumed per unit time and the transport load per unit time of the index is a vertical axis, the other is a horizontal axis, and a mean value of the indexes of the plurality of specific sections is an origin point; and the output device outputs a line indicating the transport load per unit amount of fuel consumed to be an evaluation reference and a point indicating the index of each of the plurality of specific sections to the two-dimensional graph.

According to the present invention, a management system of a mining machine comprises: a position information detector which is mounted on a mining machine enabled to travel on a plurality of routes in a mine and detects position information about the mining machine; an operation information detector which is mounted on the mining machine and detects operation information about the mining machine; and an output device which outputs an index of production efficiency of the mining machine including an amount of fuel consumed per unit time and a transport load per unit time of the mining machine in each of the plurality of routes in association with each of the plurality of routes based on the position information and the operation information, wherein the output device outputs a two-dimensional graph in which one of the amount of fuel consumed per unit time and the transport load per unit time of the index is a vertical axis, the other is a horizontal axis, and a mean value of the indexes of the plurality of routes is an origin point; and the output device outputs a line indicating the transport load per unit amount of fuel consumed to be an evaluation reference and a point indicating the index of each of the plurality of routes to the two-dimensional graph.

According to the present invention, a management system of a mining machine comprises: a position information detector which is mounted on each of a plurality of mining machines enabled to travel on a route in a mine and detects position information about each of the plurality of mining machines; an operation information detector which is mounted on each of the plurality of mining machines and detects operation information about each of the plurality of mining machines; and an output device which outputs an index of production efficiency of each of the plurality of mining machines including an amount of fuel consumed per unit time and a transport load per unit time of each of the plurality of mining machines in association with each of the plurality of mining machines based on the position information and the operation information, wherein the output device outputs a two-dimensional graph in which one of the amount of fuel consumed per unit time and the transport load per unit time of the index is a vertical axis, the other is a horizontal axis, and a mean value of the indexes of the plurality of mining machines is an origin point; and the output device outputs a line indicating the transport load per unit amount of fuel consumed to be an evaluation reference and a point indicating the index of each of the plurality of mining machines to the two-dimensional graph.

According to the present invention, a management system of a mining machine comprises: a position information detector which is mounted on a mining machine enabled to travel on a route in a mine and detects position information about the mining machine; an operation information detector which is mounted on the mining machine and detects operation information about the mining machine; and an output device which outputs an index of production efficiency of the mining machine including an amount of fuel consumed per unit time and a transport load per unit time of the mining machine in each of a plurality of work periods in association with each of the plurality of work periods based on the position information and the operation information detected in the plurality of work periods, wherein the output device outputs a two-dimensional graph in which one of the amount of fuel consumed per unit time and the transport load per unit time of the index is a vertical axis, the other is a horizontal axis, and a mean value of the indexes of the plurality of work periods is an origin point; and the output device outputs a line indicating the transport load per unit amount of fuel consumed to be an evaluation reference and a point indicating the index of each of the plurality of work periods to the two-dimensional graph.

According to the present invention, a management method for a mining machine comprises: detecting position information about a mining machine in a route, the mining machine being enabled to travel on the route in a mine, the route in the mine including a plurality of nodes disposed at a predetermined distance and a plurality of links connecting between the nodes adjacent to each other, the route including route information including a specific section in which a difference in a gradient between the links adjacent to each other is a predetermined value or less, a difference in an orientation between the links adjacent to each other is a predetermined value or less, and no intersection exists between the links adjacent to each other; detecting operation information about the mining machine; and based on the position information and the operation information, evaluating the operation information in the specific section of the route.

According to the present invention, a management method for a mining machine comprises: detecting position information about a mining machine in a route, the mining machine being enabled to travel on the route in a mine, the route in the mine including a plurality of nodes disposed at a predetermined distance and a plurality of links connecting between the nodes adjacent to each other, the route including route information including a specific section in which a difference in a gradient between the links adjacent to each other is a predetermined value or less, a difference in an orientation between the links adjacent to each other is a predetermined value or less, and no intersection exists between the links adjacent to each other, the route including a plurality of the specific sections; and detecting operation information about the mining machine; outputting an index of production efficiency of the mining machine including an amount of fuel consumed per unit time and a transport load per unit time of the mining machine in each of the plurality of specific sections obtained based on the position information and the operation information in association with each of the plurality of specific sections; and to a two-dimensional graph in which one of the amount of fuel consumed per unit time and the transport load per unit time of the index is a vertical axis, the other is a horizontal axis, and a mean value of the indexes of the plurality of specific sections, and the mining machine is an origin point, outputting a line indicating the transport load per unit amount of fuel consumed to be an evaluation reference and a point indicating the index of each of the plurality of specific sections.

According to the present invention, a management method for a mining machine comprises: detecting position information about a mining machine in each of a plurality of routes, the mining machine being enabled to travel on each of the plurality of routes in a mine; detecting operation information about the mining machine; outputting an index of production efficiency of the mining machine including an amount of fuel consumed per unit time and a transport load per unit time of the mining machine in each of the plurality of routes obtained based on the position information and the operation information in association with each of the plurality of routes; and to a two-dimensional graph in which one of the amount of fuel consumed per unit time and the transport load per unit time of the index is a vertical axis, the other is a horizontal axis, and a mean value of the indexes of the plurality of routes, and the mining machine is an origin point, outputting a line indicating the transport load per unit amount of fuel consumed to be an evaluation reference and a point indicating the index of each of the plurality of routes.

According to the present invention, a management method for a mining machine comprises: detecting position information about each of a plurality of mining machines in a route, each of the plurality of mining machines being enabled to travel on the route in a mine; detecting operation information about each of the plurality of mining machines; outputting an index of production efficiency including an amount of fuel consumed per unit time and a transport load per unit time of each of the plurality of mining machines obtained based on the position information and the operation information in association with each of the plurality of mining machines; and to a two-dimensional graph in which one of the amount of fuel consumed per unit time and the transport load per unit time of the index is a vertical axis, the other is a horizontal axis, and a mean value of the indexes of the plurality of mining machines is an origin point, outputting a line indicating the transport load per unit amount of fuel consumed to be an evaluation reference and a point indicating the index of each of the plurality of mining machines.

According to the present invention, a management method for a mining machine comprises: detecting position information about a mining machine in a route, the mining machine being enabled to travel on the route in a mine; detecting operation information about the mining machine; outputting an index of production efficiency of the mining machine including an amount of fuel consumed per unit time and a transport load per unit time of the mining machine in each of the plurality of work periods obtained based on the position information and the operation information detected in each of the plurality of work periods in association with each of the plurality of work periods; and outputting a line indicating the transport load per unit amount of fuel consumed to be an evaluation reference and a point indicating the index of each of the plurality of work periods to a two-dimensional graph in which one of the amount of fuel consumed per unit time and the transport load per unit time of the index is a vertical axis, the other is a horizontal axis, and a mean value of the indexes of the mining machine in each of the plurality of work periods is an origin point.

According to the present invention, it is possible to appropriately determine the superiority of production efficiency.

DESCRIPTION OF EMBODIMENTS

In the following, an embodiment of the present invention will be described with reference to the drawings. However, the present invention is not limited thereto.

<The Outline of a Management System of a Mining Machine>

Figure 1:
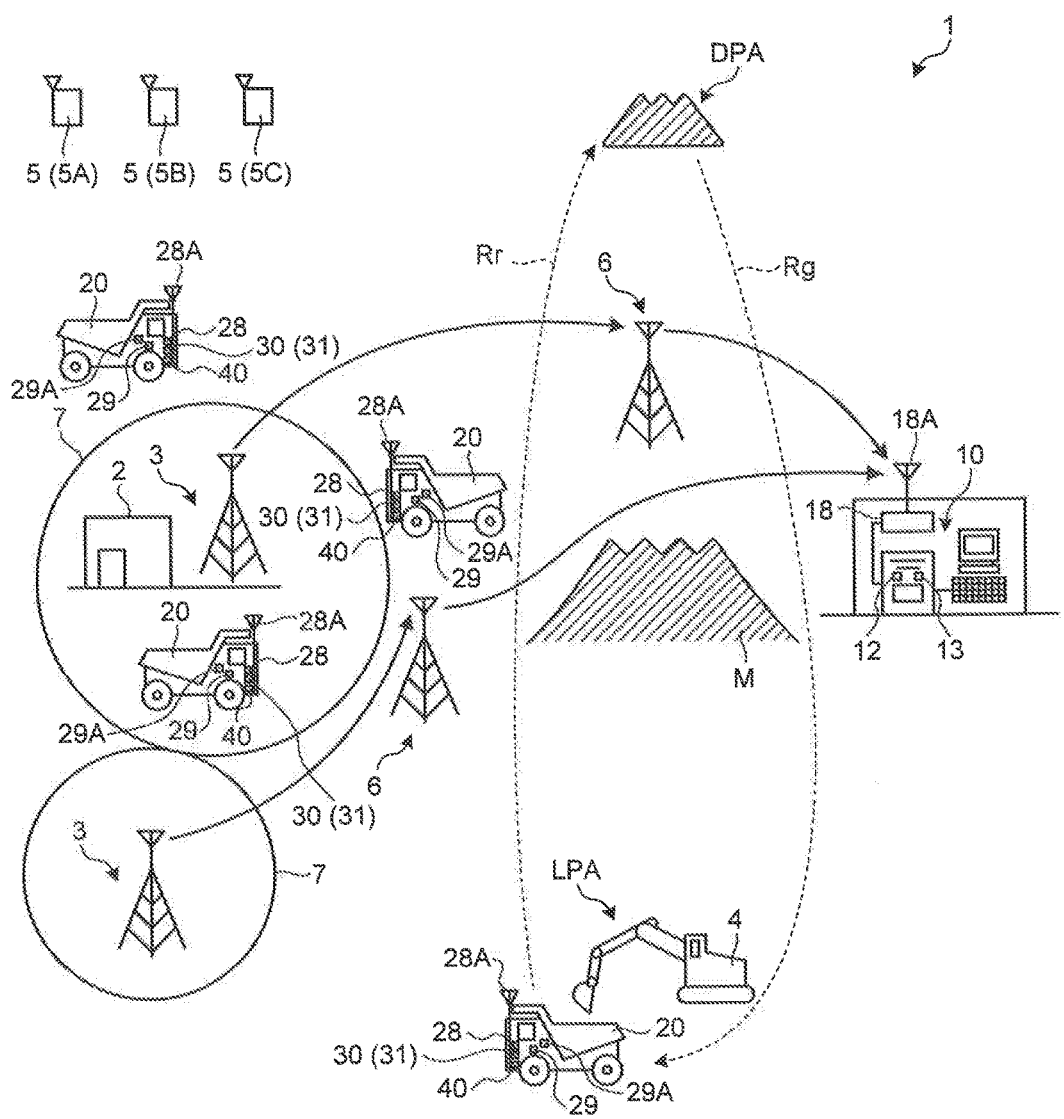
FIG. 1 is a diagram of an exemplary a management system of a mining machine according to an embodiment.

FIG. 1 is a diagram of a site to which a management system of a mining machine according to an embodiment is applied. A management system 1 for a mining machine manages the operations of mining machines or evaluates the production efficiency or the manipulation technique, for example, of the operator of the mining machine, and performs preventive maintenance and abnormality diagnosis, for example, of dump tracks. To this end, the management system 1 identifies a route on which a dump track 20 has traveled, and stores the route as route information. In the following, it is defined that the traveling route includes the route on which the dump track 20 has traveled and places to stop. In the following, the traveling route is appropriately referred to as a route.

The mining machine is a generic term of machines for use in various work operations in a mine. In the embodiment, for one kind of trucks of the mining machines, the dump track 20 is taken as an example, which carries crushed stones or dirt or rocks produced in mining crushed stones, for example, as a load. However, the mining machine according to the embodiment is not limited to the dump track. For example, the mining machine according to the embodiment may be a digging machine that mines crushed stones, for example, and a hydraulic excavator, electric shovel, or wheel loader functioning as a loader that loads a load on the dump track 20. In the embodiment, the dump track 20 is a manned mining machine that travels and unloads a load by the manipulation by an operator. However, the dump track 20 is not limited to such a vehicle. For example, the dump track 20 may be an unattended dump track whose operation is managed by the management system 1.

In the mine, the dump track 20 is loaded with rocks or dirt, for example, by a loader 4 such as a hydraulic excavator at a place (in the following, a loading site) LPA at which a loading operation is performed. The dump track 20 then unloads the loaded rocks or dirt, for example, at a place (in the following, an unloading site) DPA at which the load is unloaded. The dump track 20 moves between the loading site LPA and the unloading site DPA as traveling on routes Rg and Rr.

<The Outline of a Management System of a Mining Machine>

In the management system of the mining machine (in the following, appropriately referred to as the management system) 1, a management apparatus 10 collects information about the position of the dump track 20 as a mining machine (in the following, referred to as position information) and information about an operation state (in the following, referred to as operation information) from the dump track 20 via wireless communications. Different from the dump track 20, which is a mobile unit, the management apparatus 10 is disposed on the management facility of the mine, for example. As described above, the management apparatus 10 is not intended for mobile use in principle. The information collected at the management apparatus 10 includes position information about the dump track 20 (the coordinates of the latitude, the longitude, and the altitude) and operation information about the dump track 20. For example, the operation information is at least one of the traveling time, the distance covered, the engine water temperature, the presence or absence of an abnormality, the location of an abnormality, the fuel consumption rate, the loadage (a vehicle live load), and so on. The position information and the operation information are mainly used for creating the traveling route map of the dump track 20, traveling route mapping, drive evaluation, production efficiency evaluation, preventive maintenance, and abnormality diagnosis, for example. Therefore, the position information and the operation information are useful for cooping with needs such as the improvement of production efficiency in the mine or the improvement of operations in the mine. The operation information will be described later in detail.

The management system 1 includes a position information detector 29 that is mounted on the dump track 20 and detects position information about the dump track 20, an operation information detector 40 that is mounted on the dump track 20 and detects operation information about the dump track 20, an on-vehicle processor 30 that is mounted on the dump track 20 and performs various processes related to management, an on-vehicle storage device 31 that is mounted on the dump track 20 and stores various items of information about management, a management side processor 12 that is provided on the management apparatus 10 and performs various processes related to management, and a management side storage device 13 that is provided on the management apparatus 10 and stores various items of information about management.

The on-vehicle processor 30 processes position information and operation information about the dump track 20. The on-vehicle storage device 31 stores position information and operation information about the dump track 20. The position information and the operation information about the dump track 20 are sent from the dump track 20 to the management apparatus 10 via wireless communications. The management side storage device 13 of the management apparatus 10 stores the received position information and the operation information about the dump track 20. The operation information is stored in association with the position information.

Moreover, the management system 1 registers (stores) position information about a route (the registered route) to be a comparative object (in the following, referred to as route information) when a route on which the dump track 20 has actually traveled (the actual traveling route) is identified on one or both of the management side storage device 13 and the on-vehicle storage device 31. The management system 1 identifies the actual traveling route by determining whether to match the position information about the stored actual traveling route with the position information about the registered route. Furthermore, the management system 1 combines the operation information about the identified actual traveling route with the operation information included in the registered route, and performs evaluation to extract problems to be bottlenecks of production efficiency on routes based on the combined operation information about the registered routes.

The operation information about the dump track 20 includes at least one of information about the vehicle and information about the operation status.

For example, the vehicle information about the dump track 20 includes information about the vehicle state and information about an abnormality. For example, the information about the operation status of the dump track 20 includes information about operation hours, information about traveling, information about drive manipulation by the operator, and information about a load carried.

For example, the information about the vehicle state of the dump track 20 includes information about the amount of fuel consumed per unit time, information about the engine, information about the drive system, information about the manipulation system, information about events, information about the engine speed (the rotation speed) of the engine, information about the temperature of the cooling fluid of the engine, information about the transmission state, and information about the engine speed (the rotation speed) of the drive shaft.

For example, the information about an abnormality of the dump track 20 includes information about the presence or absence of an abnormality, information about the location of an abnormality, information about the content of the abnormality, information about a failure, and information about vehicle errors.

For example, the information about operation hours of the dump track 20 includes information about the operation start time and information about the operation finish time.

For example, the information about traveling of the dump track 20 includes information about whether the dump track 20 is traveling, information about the traveling speed, information about the distance covered, information about acceleration (deceleration) in traveling, information about the traveling time, information about the down time (stoppage time), information about the acceleration frequency, the information about the deceleration frequency, the information about the stop frequency (the stoppage frequency), information about the traveling time by inertia, and information about the distance covered by inertia.

For example, the information about the drive manipulation of the dump track 20 includes information about abnormal drives (abnormal manipulations), information about manipulation history, and information about events.

For example, the information about abnormal drives (abnormal manipulations) of the dump track 20 includes information about the presence or absence of an abnormal manipulation by the operator and information about the content of the abnormal manipulation.

For example, the information about a load carried on the dump track 20 includes information about the presence or absence of a load, information about a transport load (a loadage), information about the loading operation, and information about the unloading operation. The information about the loading operation includes information about whether to start the loading operation, information about whether the loading operation is being performed, information about whether to finish the loading operation, and information about the loading operation time, for example. The information about the unloading operation includes information about whether to start the unloading operation, information about whether the unloading operation is being performed, information about whether to finish the unloading operation, and information about the unloading operation time, for example.

It is noted that the operation information about the dump track 20 may include information about the route on which the dump track 20 travels. For example, the operation information about the dump track 20 may include information about jams, information about the gradient of the route, information about the orientation of the route, and information about the route state. For example, the information about jams includes information about the presence or absence of a jam and information about a degree of the jam. For example, the information about the gradient of the route includes information about the presence or absence of a gradient and information about the tilt angle of the route. For example, the information about the orientation of the route includes information about the presence or absence of a curve (a corner) on the route and information about the angle of the curve (the corner) on the route. For example, the information about the route state includes information about whether the route is dry or wet, information about the degree how the route is dry, information about the degree how the route is wet, and information about the presence or absence of an obstacle.

For example, the operation information about the dump track 20 is used for the evaluation of the production efficiency of the dump track 20, the evaluation of the driving technique of the operator of the dump track 20, the maintenance of the dump track 20, and the abnormality diagnosis of the dump track 20.

The operation information detector 40 includes a plurality of sensors that detects operation information about the dump track 20. The operation information about the dump track 20 detected at the operation information detector 40 is sent to the management apparatus 10 through an on-vehicle wireless communication device 28 and a management side wireless communication device 18.

The management apparatus 10 is connected to the management side wireless communication device 18 including an antenna 18A to collect position information and operation information about the dump track 20 operating in the mine. The dump track 20 includes the on-vehicle wireless communication device 28 and an antenna 28A to send position information and operation information or to mutually communicate with the management apparatus 10. The on-vehicle wireless communication device will be described later. In addition to this, the dump track 20 receives radio waves from a plurality of GPS (Global Positioning System) satellites 5 (5A, 5B, and 5C) at a GPS antenna 29A, and can position the location of the dump track 20 using the position information detector 29. It is noted that in order to position the location of the dump track 20 itself, other positioning satellites may be used, not limited to the GPS satellites. Namely, it is sufficient that the GNSS (Global Navigation Satellite System) is used to position the location.

The output of radio waves sent from the dump track 20 through the antenna 28A is not in the communication range that can cover the entire mine. Moreover, it is not enabled that the radio waves sent from the antenna 28A are sent over a distance beyond an obstacle M such as a high mountain because of wavelengths. Of course, when a wireless communication device that can output high-output radio waves is used, it is possible that such communication failures are eliminated, the communication feasible range is spread, and communication infeasible places are eliminated. However, since the mine is far and wide, it is necessary to cope with the situation as in which it is necessary to suppress the costs of repeaters and communication devices and the situation as in which it is unexpected to secure well-equipped communication infrastructures depending on regions where mines are located. Therefore, the management system 1 uses a wireless system that can form an information communication network in a limited range such as a wireless LAN (Local Area Network). Although it is possible to establish mutual communications between the mining machine and the management facility (the management apparatus 10) at low costs via a wireless LAN, for example, it is necessary to solve problems of communication failures.

A limitation is imposed on the coverage of the radio waves sent from the dump track 20 through the antenna 28A. Therefore, when the dump track 20 is apart from the management apparatus 10, or when an obstacle such as a mountain M exists between the dump track 20 and the management apparatus 10, it is difficult for the management side wireless communication device 18 to receive radio waves sent from the dump track 20. Thus, the management system 1 includes a repeater 3 that relays radio waves sent from the antenna 28A of the dump track 20 and sends the radio waves to the management side wireless communication device 18. The repeater 3 is disposed at a plurality of predetermined places in the mine, so that the management apparatus 10 can collect position information and operation information from the dump track 20 operated at a location far from the management apparatus 10 via wireless communications.

In the case where the repeater 3 is apart from the management side wireless communication device 18, an intermediate repeater 6 is disposed between the repeater 3 and the management side wireless communication device 18 to relay the repeater 3 to the management side wireless communication device 18. In the embodiment, the intermediate repeater 6 only relays the repeater 3 to the management side wireless communication device 18, and does not relay the radio waves sent from the antenna 28A of the dump track 20. In the embodiment, the intermediate repeater 6 relays radio waves only from the corresponding repeater 3. For example, as illustrated in FIG. 1, only a single intermediate repeater 6 relays radio waves from the repeater 3 at a service station 2. It is noted that in FIG. 1, the intermediate repeater 6 is expressed as in the one-to-one relationship with a single repeater 3. However, the relationship is not limited to the one-to-one relationship, and the intermediate repeaters 6 can relay radio waves sent from a plurality of the repeaters 3.

A predetermined region around the place at which the repeater 3 is disposed (a region in a circle in FIG. 1) is a range in which the on-vehicle wireless communication device 28 mounted on the dump track 20 can mutually communicate with the repeater 3 via wireless communications, that is, a communication feasible range 7. The dump track 20 in the communication feasible range 7 can mutually communicate with the management side wireless communication device 18 via wireless communications through the repeater 3, for example.

<The Management Apparatus>

Figure 2:
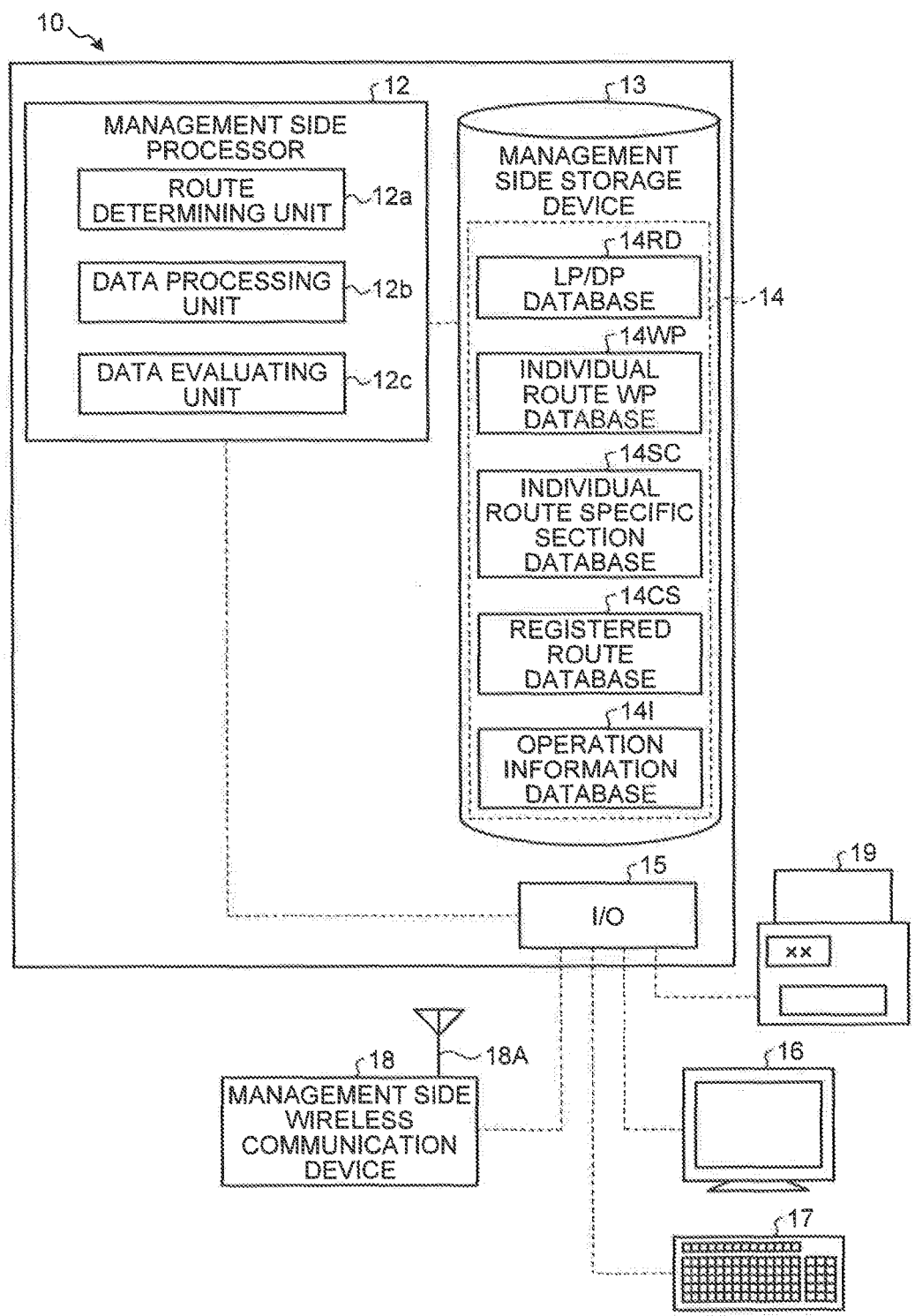
FIG. 2 is a diagram of an exemplary management apparatus according to the embodiment.

Next, the management apparatus 10 will be described in detail. FIG. 2 is a functional block diagram of an exemplary management apparatus 10 according to the embodiment. The management apparatus 10 includes the management side processor 12, the management side storage device 13, and an input/output unit (I/O) 15. Moreover, in the management apparatus 10, a display device 16, an input device 17, the management side wireless communication device 18, and a printing device 19 are connected to the input/output unit 15.

The management apparatus 10 is a computer, for example. The management side processor 12 is a CPU (Central Processing Unit), for example. For example, the management side storage device 13 is a RAM (Random Access Memory), a ROM (Read Only Memory), a flash memory, or a hard disk drive, or a combination of them. The input/output unit 15 is used for input and output (an interface) of information between the management side processor 12 and the display device 16, the input device 17, the management side wireless communication device 18, and the printing device 19 externally connected to the management side processor 12.

The management side processor 12 performs a management method for a mining machine according to the embodiment. The management side processor 12 includes a route determining unit 12a, a data processing unit 12b, and a data evaluating unit 12c. The route determining unit 12a as a determining unit identifies the actual traveling route by determining whether the actual traveling route is matched with the registered route. The registered route is a route on which the dump track 20 has traveled in the past or a preset route.

The data processing unit 12b processes position information and operation information about the dump track 20, and finds operation information about the dump track 20 that has traveled on the route. The data evaluating unit 12c evaluates the operation state of the dump track 20 on the route on which the dump track 20 has traveled based on the operation information about the dump track 20 found at the data processing unit 12b. These functions are implemented in which the management side processor 12 reads the corresponding computer programs out of the management side storage device 13 and executes the programs.

The management side storage device 13 stores various computer programs to cause the management side processor 12 to execute various processes. In the embodiment, for example, the computer programs stored on the management side storage device 13 includes a route identification computer program that implements the management method for a mining machine according to the embodiment and identifies the route on which the dump track 20 has traveled, an operation information collecting computer program that collects position information and operation information about the dump track 20, for example, and computer programs that perform various evaluations based on the position information and the operation information.

The management side storage device 13 stores a database 14 on which various items of information about management are described. The database 14 includes an LP/DP database 14RD, an individual route WP database 14WP, an individual route specific section database 14SC, a registered route database 14CS, and an operation information database 14I. The LP/DP database 14RD is described with position information about the loading site LPA and the unloading site DPA of the dump track 20. The individual route WP database 14WP is described with position information about a passage position WP on the route on which the dump track 20 has traveled or is to travel. The individual route specific section database 14SC is described with position information about a specific section that is a portion including the same characteristics (the gradient and orientation of the route, for example) on the route on which the dump track 20 has traveled or is to travel. The registered route database 14CS is described with information including position information about a preset route (a registered route) as a route on which the dump track 20 operating in the mine has traveled or a route on which the dump track 20 operating in the mine has to travel. In the embodiment, the operation information database 14I is described with operation information collected from the dump track 20. The individual route WP database 14WP and the individual route specific section database 14SC include aggregated data including the coordinates of the latitude, the longitude, and the altitude of position information.

For example, the display device 16 is a flat panel display such as a liquid crystal display, and displays information necessary for collecting and evaluating position information or operation information about the dump track 20. For example, the input device 17 is a keyboard, a touch panel, or a mouse, and inputs information necessary in collecting position information or operation information about the dump track 20. The management side wireless communication device 18 includes the antenna 18A, and performs mutual wireless communications with the on-vehicle wireless communication device 28 of the dump track 20 through the repeater 3. For example, the printing device 19 is a printing device (a printer), and prints and outputs reports generated at the management apparatus 10 or graphs for evaluation. The printing device 19 may output sounds according to the content of a report described later. The display device 16 and the printing device 19 are one kind of output devices that output various items of information, for example.

<The Dump Track>

Figure 3:
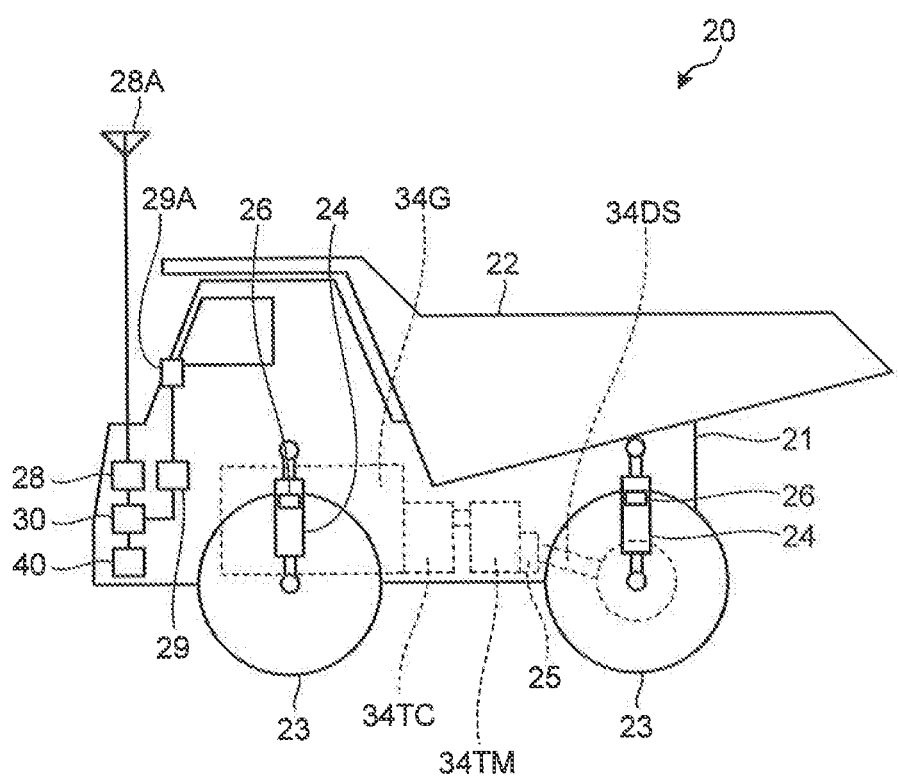
FIG. 3 is a diagram of an exemplary dump track according to the embodiment.

Next, the dump track 20 will be described more in detail. FIG. 3 is a diagram of an exemplary configuration of the dump track 20. The dump track 20 loads a load and travels, and unloads the load at a desired place. The dump track 20 includes a vehicle main body 21, a vessel 22, a wheel 23, a suspension cylinder 24, a rotation sensor 25, a suspension pressure sensor (in the following, referred to as a pressure sensor) 26, the on-vehicle wireless communication device 28 to which the antenna 28A is connected, the position information detector (the GPS receiver, in the embodiment) 29 to which the GPS antenna 29A is connected, the on-vehicle processor 30, and the operation information detector 40 including a plurality of sensors. It is noted that the dump track 20 includes various mechanisms and functions included in a typical track, other than the configurations described above. It is noted that in the embodiment, a rigid dump track 20 is taken as an example. However, the dump track 20 may be an articulated dump track in which the car body is split into a front part and a rear part and the front part is joined to the rear part using a free joint.

In the dump track 20, an internal combustion engine such as a diesel engine (in the following, appropriately referred to as an engine 34G) drives a drive shaft 34DS through a torque converter 34TC and a transmission 34TM for driving the wheel 23. As described above, the dump track 20 is in a so-called machine drive mode. However, the drive mode of the dump track 20 is not limited thereto, which may be a so-called electric drive mode. The vessel 22 functions as a carriage on which a load is loaded, and elevatably disposed on the upper part of the vehicle main body 21. On the vessel 22, quarried crushed stones, rocks, or dirt, for example, are loaded using the loader 4 such as a hydraulic excavator.

The wheel 23 includes tires and wheels, and rotatably mounted on the vehicle main body 21. The wheel 23 is driven by transmitting power from the vehicle main body 21 through the drive shaft 34DS as described above. The suspension cylinder 24 is disposed between the wheel 23 and the vehicle main body 21. A load according to the masses of the vehicle main body 21 and the vessel 22 and the mass of a load when the load is loaded acts on the wheel 23 through the suspension cylinder 24.

The rotation sensor 25 detects the rotation speed of the drive shaft 34DS to measure the vehicle speed. A hydraulic oil is sealed in the inside of the suspension cylinder 24, and the suspension cylinder 24 extends and contracts according to the weight of a load. It is noted that the suspension pressure sensor (also referred to as a pressure sensor as necessary) 26 detects a load acting on the suspension cylinder 24. The pressure sensor 26 is individually disposed on the suspension cylinders 24 of the dump track 20, in which the pressure of the hydraulic oil is detected to detect the presence or absence of a load and to measure the mass (the loadage) of a load.

The GPS antenna 29A receives radio waves outputted from a plurality of the GPS satellites 5A, 5B, and 5C forming the GPS (Global Positioning System) (see FIG. 1). The GPS antenna 29A outputs the received radio waves to the position information detector 29. The position information detector 29 as a position information detecting unit converts the radio waves received at the GPS antenna 29A into electrical signals, and calculates (positions) position information about the position information detector 29, that is, the position of the dump track 20 for finding position information about the dump track 20. The position information is information about the position of the dump track 20, and is the coordinates of the latitude, the longitude, and the altitude. A plurality of items of position information, which a plurality of items of position information acquired at the position information detector 29 based on a lapse of time is arranged in a time series, is the route on which the dump track 20 has traveled.

The on-vehicle wireless communication device 28 mutually communicates with the repeater 3 or the antenna 18A on the management facility illustrated in FIG. 1 through the antenna 28A via wireless communications. The on-vehicle wireless communication device 28 is connected to the on-vehicle processor 30. With this structure, the on-vehicle processor 30 sends and receives items of information through the antenna 28A.

<The On-Vehicle Processor, the On-Vehicle Storage Device, the Position Information Detector, and the Operation Information Detector>

Figure 4:
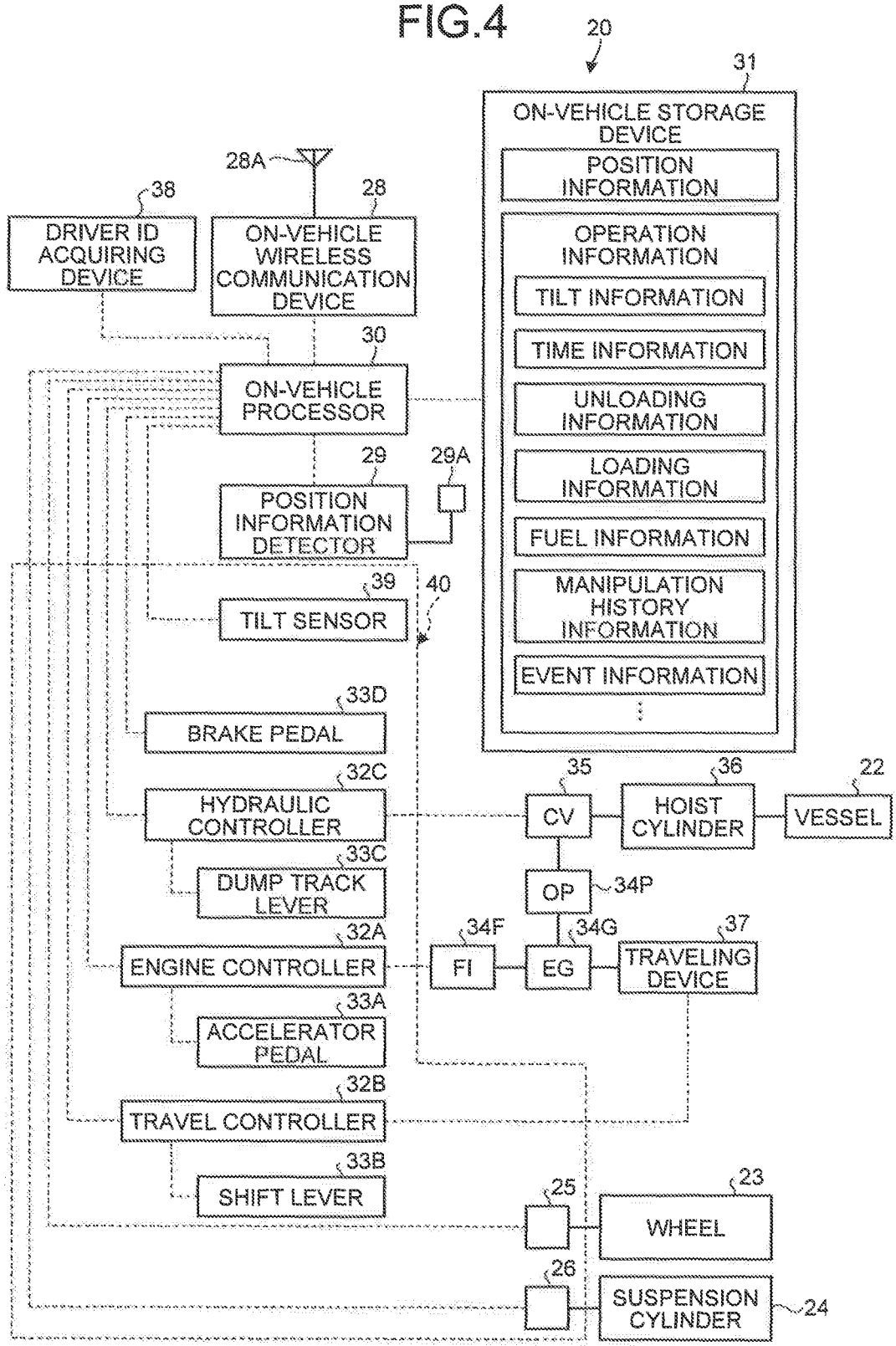
FIG. 4 is a diagram of an exemplary on-vehicle processor, on-vehicle storage device, position information detector, and operation information detector according to the embodiment.

Next, the on-vehicle processor 30, the on-vehicle storage device 31, the position information detector 29, and the operation information detector 40 will be described. FIG. 4 is a functional block diagram of examples of the on-vehicle processor 30 and peripheral devices according to the embodiment.

As illustrated in FIG. 4, the dump track 20 includes the on-vehicle processor 30, the on-vehicle storage device 31, the on-vehicle wireless communication device 28, the position information detector 29, a driver ID acquiring device 38, and the operation information detector 40. The on-vehicle storage device 31, the on-vehicle wireless communication device 28, the position information detector 29, the driver ID acquiring device 38, and the operation information detector 40 are connected to the on-vehicle processor 30. For example, the on-vehicle processor 30 is a computer that combines a CPU (Central Processing Unit) with a memory.

The on-vehicle processor 30 acquires and processes various items of information about the dump track 20.

The driver ID acquiring device 38 is a device that acquires a driver ID to identify the driver of the dump track 20 (in the following, also referred to as an operator). The dump track 20 is sometimes alternately driven by a plurality of drivers. For example, the driver ID can be acquired from individual ID keys of drivers (electronic keys on which personal identification information is stored) or individual ID cards of drivers (cards on which personal identification information is stored). In this case, a magnetic reader or a wireless communication device, for example, is used for the driver ID acquiring device 38. Moreover, it may be possible in which a fingerprint recognition device is provided as the driver ID acquiring device 38 and fingerprint identification is individually performed between the fingerprint of the driver stored in advance and the fingerprint of the driver to acquire a driver ID. Furthermore, the driver ID can also be acquired in which drivers individually input ID information (personal identification information such as a password number) about the drivers using an input device to check the ID information against ID information stored in advance. As described above, the driver ID acquiring device 38 is an ID key reader, an ID card reader, a fingerprint recognition device, or the ID information input device, for example, and the driver ID acquiring device 38 may be provided near the driver seat in the driver's cab of the dump track 20 or provided at a given place on the vehicle main body 21 to which the driver comes close when making access to the driver's cab. It is noted that the driver IDs of drivers boarding on the dump tracks 20 are sometimes sent from the management apparatus 10 to the dump track 20 via wireless communications according to daily production plans of the mine. In this case the on-vehicle wireless communication device 27 also serves as the driver ID acquiring device 38. It is possible to identify which driver drives which dump track 20 using the driver ID acquired at the driver ID acquiring device 38.

For example, the on-vehicle storage device 31 includes a RAM (Random Access Memory), a ROM (Read Only Memory), a flash memory, or a hard disk drive, or a combination of them. The on-vehicle storage device 31 stores a computer program described with instructions to collect position information and operation information about the dump track 20 at the on-vehicle processor 30 and various set values to operate the management system 1 for the mining machine, for example. The on-vehicle processor 30 reads the computer program, acquires position information from the position information detector 29 at a predetermined timing, acquires operation information from the sensors included in the operation information detector 40, and temporarily stores the operation information on the on-vehicle storage device 31. At this time, the on-vehicle processor 30 may perform a statistical process to find the mean value, mode, or standard deviation, for example, on the same item of information.

The on-vehicle storage device 31 stores clinometer information, time information, unloading information, loading information, fuel consumption information, manipulation history information, and event information, for example, as operation information. For example, the event information means vehicle error information, abnormal drive information, and failure information. These items of operation information stored on the on-vehicle storage device 31 are examples, and operation information is not limited thereto. It is noted that the operation information will be described later in detail. The position information, the clinometer information, the unloading information, the loading information, the fuel consumption information, the manipulation history information, and the event information, for example, are stored on the on-vehicle storage device 31 in association with time at which these items of information occur (time at which the on-vehicle processor 30 acquires these items of information). The on-vehicle processor 30 receives an instruction signal expressing a request from the management apparatus 10 illustrated in FIG. 2 through the on-vehicle wireless device 28, and sends position information and operation information stored on the on-vehicle storage device 31 to the management apparatus 10 similarly through the on-vehicle wireless communication device 28.

The position information detector 29 detects position information about the dump track 20. The on-vehicle processor 30 acquires position information about the dump track 20 using the position information detector 29.

The on-vehicle processor 30 finds the route on which the dump track 20 has traveled (the actual traveling route) based on a plurality of items of position information detected at the position information detector 29 and time information at which the position information is detected. A plurality of items of position information arranged in a time series expresses the actual traveling route of the dump track 20.

The operation information detector 40 detects operation information about the dump track 20. The on-vehicle processor 30 acquires operation information about the dump track 20 using the operation information detector 40. The operation information detector 40 includes a plurality of sensors that detects operation information about the dump track 20. For example, the operation information detector 40 includes the rotation sensor 25 that detects the traveling speed of the dump track 20, the pressure sensor 26 that detects the weight of the load carried on the dump track 20, an engine controller 32A, a travel controller 32B, a hydraulic controller 32C, and a tilt sensor 39. In the following, examples of items of operation information that can be acquired based on the signals of these sensors will be described in detail.

The rotation sensor 25 detects the rotation speed of the drive shaft 34DS that drives the wheel 23. The result detected at the rotation sensor 25 is outputted to the on-vehicle processor 30. The on-vehicle processor 30 can derive the traveling speed of the dump track 20 based on the output from the rotation sensor 25. Moreover, the on-vehicle processor 30 can derive the acceleration (deceleration) of the dump track 20 based on the output from the rotation sensor 25. Furthermore, the on-vehicle processor 30 can determine whether the dump track 20 is traveling or stops based on the output from the rotation sensor 25.

In addition, the on-vehicle processor 30 can derive at least one of the distance covered, the traveling time, and the down time (stoppage time) of the dump track 20 based on time information detected at a built-in timer and the output from the rotation sensor 25. Moreover, the on-vehicle processor 30 can derive the number of times (the acceleration frequency) that the dump track 20 accelerates on the route, the number of times (the deceleration frequency) that the dump track 20 decelerates, and the number of times (the stoppage frequency) that the dump track 20 stops (the stoppage operation), for example, based on time information detected at the built-in timer and the output from the rotation sensor 25.

The pressure sensor 26 detects a pressure acting on the hydraulic oil of the suspension cylinder 24. The result detected at the pressure sensor 26 is outputted to the on-vehicle processor 30. The on-vehicle processor 30 can derive the weight (the loadage and the transport load) of a load based on the output values of the pressure sensors 26 individually provided on the suspension cylinders 24 mounted on the four the wheels 23 of the dump track 20. Since the on-vehicle processor 30 can measure the weight of the load, the on-vehicle processor 30 can determine the presence or absence of a load on the vessel 22.

The on-vehicle processor 30 can determine whether to start loading a load on the vessel 22, whether a load is being loaded, whether to finish loading a load, whether to start unloading a load out of the vessel 22, whether a load is being unloaded, whether to finish unloading a load, and whether the dump track 20 is traveling, for example, based on time information detected at the built-in timer and the output from the pressure sensor 26. For example, in the case where the value of the output from the pressure sensor 26 is increased and exceeds a predetermined value (a half of a prescribed loadage value of the dump track 20, for example), the on-vehicle processor 30 can determine that a load is being loaded at the loading site LPA. Moreover, in the case where the value of the output from the pressure sensor 26 is reduced and falls below a predetermined value (a quarter of a prescribed loadage value of the dump track 20, for example), the on-vehicle processor 30 can determine that a load is being unloaded at the unloading site DPA. It is noted that the on-vehicle processor 30 may make a determination on the loading operation and the unloading operation based on the output from the pressure sensor 26, the manipulation state of a dump track lever 33C (one or both of the operative position and the manipulated variable), or both, or may make a determination on the unloading operation based only on the manipulation state of the dump track lever 33C (one or both of the operative position and the manipulated variable).

The engine controller 32A outputs the controlled variable of a fuel injector 34F to the on-vehicle processor 30. The on-vehicle processor 30 can derive the fuel injection quantity by acquiring the controlled variable of the fuel injector 34F, and can derive the amount of fuel consumed based on the fuel injection quantity. Furthermore, the on-vehicle processor 30 can derive the amount of fuel consumed per unit distance covered based on the distance covered of the dump track 20 derived using the rotation sensor 25, for example, and the fuel injection quantity. In addition, the on-vehicle processor 30 can derive the distance covered per unit amount of fuel consumed based on the distance covered and the fuel injection quantity. Moreover, the on-vehicle processor 30 can derive the amount of fuel consumed per unit time based on time information detected at the built-in timer and the fuel injection quantity. Furthermore, the on-vehicle processor 30 can derive the transport load per unit time based on time information detected at the built-in timer and the transport load derived using the pressure sensor 26, for example. Furthermore, the on-vehicle processor 30 can derive the transport load per unit amount of fuel consumed based on the transport load and the fuel injection quantity. It is noted that the transport load per unit amount of fuel consumed may be found based on the amount of fuel consumed per unit time and the transport load per unit time.

The on-vehicle processor 30 can derive the traveling time by inertia and distance covered by inertia of the dump track 20 based on information about the manipulation of an accelerator pedal 33A, time information detected at the built-in timer, and the output from the rotation sensor 25. Traveling by inertia means that in the state in which the dump track 20 travels at a certain speed by operating the accelerator pedal 33A, the dump track 20 travels by inertia (coasting) after the operator releases the operation of the accelerator pedal 33A (after the operator stops pressing down the accelerator pedal 33A). The traveling time of the dump track 20 by inertia means the time for which the dump track 20 travels by inertia (coasting). The distance covered by the dump track 20 by inertia means a distance for which the dump track 20 has traveled by inertia (coasting). Moreover, the on-vehicle processor 30 can derive the speed (the traveling speed) of the dump track 20 at a time point when the dump track 20 starts traveling by inertia based on information about the manipulated variable of the accelerator pedal 33A and the output from the rotation sensor 25.

The tilt sensor 39 detects the inclination of the dump track 20 in the longitudinal direction. The result detected at the tilt sensor 39 is outputted to the on-vehicle processor 30. The on-vehicle processor 30 can derive information about the gradient (the slope) of the route on which the dump track 20 travels and information about irregularities of the route, for example, based on the output from the tilt sensor 39.

The on-vehicle processor 30 acquires a plurality of items of position information (time series data) about the dump track 20 detected at the position information detector 29 at every predetermined time in association with a lapse of the time. The plurality of acquired items of position information (time series data) is stored on the on-vehicle storage device 31 in association with time information.

Moreover, the on-vehicle processor 30 acquires a plurality of items of operation information (time series data) about the dump track 20 detected at the operation information detector 40 at every predetermined time in association with a lapse of the time.

As described above, the on-vehicle processor 30 acquires operation information about the dump track 20 in association with the position information through time information, and the operation information associated with the position information is stored on the on-vehicle storage device 31.

The on-vehicle processor 30 sends the position information associated with the time information stored on the on-vehicle storage device 31 and the operation information associated with the position information to the management side processor 12 of the management apparatus 10 through the on-vehicle wireless communication device 28.

When the management side processor 12 receives the position information associated with the time information and the operation information associated with the position information from the on-vehicle processor 30 through the management side wireless communication device 18, the management side processor 12 stores these items of information on the management side storage device 13.

Figure 5:
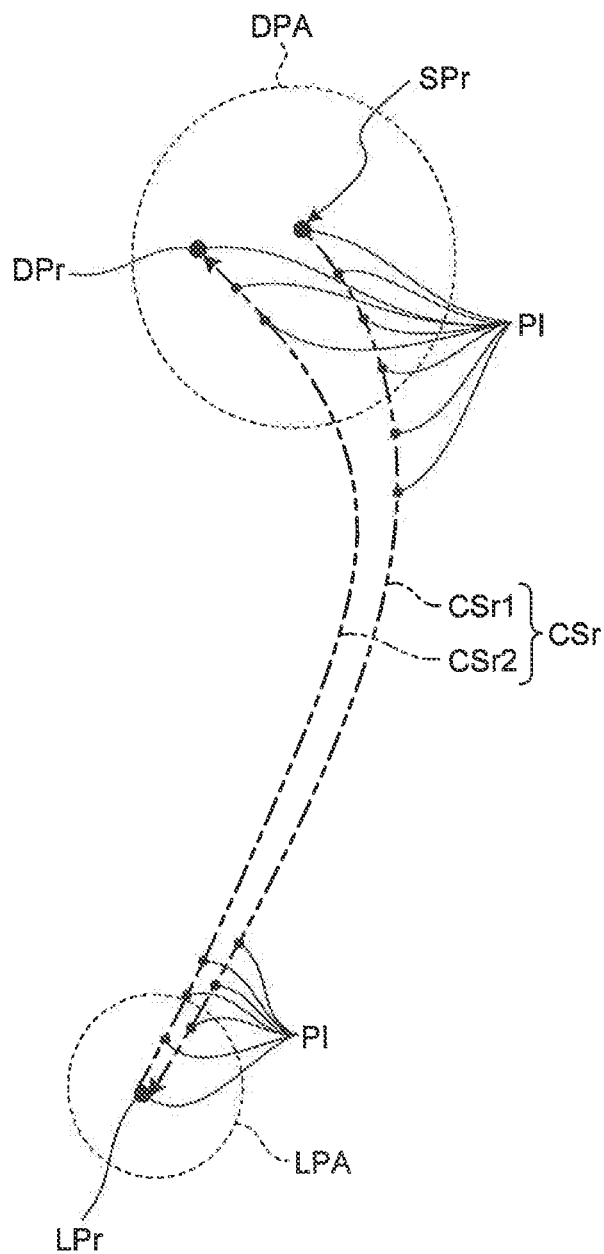
FIG. 5 is a diagram of an exemplary route on which a dump track has traveled.

FIG. 5 is a diagram of an exemplary route on which the dump track 20 has actually traveled. The dump track 20 unloads a load at the unloading site DPA illustrated in FIG. 5, and then travels toward the loading site LPA. The dump track 20 arrives at the loading site LPA, and a load is loaded on the vessel 22 by a loading mining machine such as a hydraulic excavator. The dump track 20 on which the load is loaded travels toward the unloading site DPA. The dump track 20 arrives at the unloading site DPA, and unloads the load at the unloading site DPA. In the embodiment, a cycle of the carrying operation of the dump track 20 is a series of work operations in which the dump track 20 starts from a predetermined place to the loading site LPA, loads a load at the loading site LPA, arrives at the unloading site DPA, and unloads the load. It is noted that the definition of a cycle of the carrying operation is not limited thereto. A cycle may be defined as work operations in which the starting point is a position at which the dump track 20 starts loading a load at a loading site, for example, finishes unloading operation, and then arrives at a loading site.

A predetermined place where the dump track 20 starts toward the loading site LPA is referred to as a first position, the loading site LPA is referred to as a second position, and a position at which the load is unloaded in the unloading site DPA is referred to as a third position. In the embodiment, the first position may be a predetermined position in the unloading site DPA or may be a predetermined position different from the unloading site DPA.

In a route on which the dump track 20 travels (in the following, appropriately referred to as an actual traveling route) CSr in a cycle of the carrying operation, a route on which the dump track 20 moves from a travel starting position SPr as the first position to a loading position LPr as the second position at which the dump track 20 loads a load in the loading site LPA is referred to as a going route CSr1. Moreover, in the actual traveling route CSr, a route on which the dump track 20 moves from the loading position LPr as the second position to an unloading position DPr as the third position at which the dump track 20 unloads the load in the unloading site DPA is referred to as a returning route CSr2. The going route CSr1 includes the travel starting position SPr as a starting point and the loading position LPr as an end point. The returning route CSr2 includes the loading position LPr as a starting point and the unloading position DPr as an end point.

The position information detector 29 mounted on the dump track 20 finds position information PI about the dump track 20 that the dump track 20 starts from the travel starting position SPr, arrives at the loading position LPr, and then goes to the unloading position DPr. For example, the position information detector 29 acquires present position information about the dump track 20 for every predetermined time period (a second, for example), and stores the information on the on-vehicle storage device 31. A group of a plurality of items of position information PI acquired at the position information detector 29 (in the following, appropriately referred to as a position information group) is included in the actual traveling route CSr of the dump track 20. Thus, the actual traveling route CSr can be expressed by a plurality of items of position information PI.

In the embodiment, the actual traveling route CSr is sometimes a registered route that is already stored (registered) on the management side storage device 13 because another dump track 20 has traveled or the dump track 20 has traveled by itself or the route is preset, or the actual traveling route CSr is sometimes a route on which the dump track 20 travels for a first time. The management side processor 12 illustrated in FIG. 2 identifies the actual traveling route CSr in which the management side processor 12 performs a predetermined route identification process to determine whether the actual traveling route CSr is matched with a registered route, whether a part of the actual traveling route CSr is a part of a registered route, or whether the actual traveling route CSr is a totally new route, for example. It is noted that the route identification process is performed at the management side processor 12 included in the management apparatus 10 illustrated in FIG. 2. However, the process may be performed at the on-vehicle processor 30 illustrated in FIG. 4.

Figure 6:
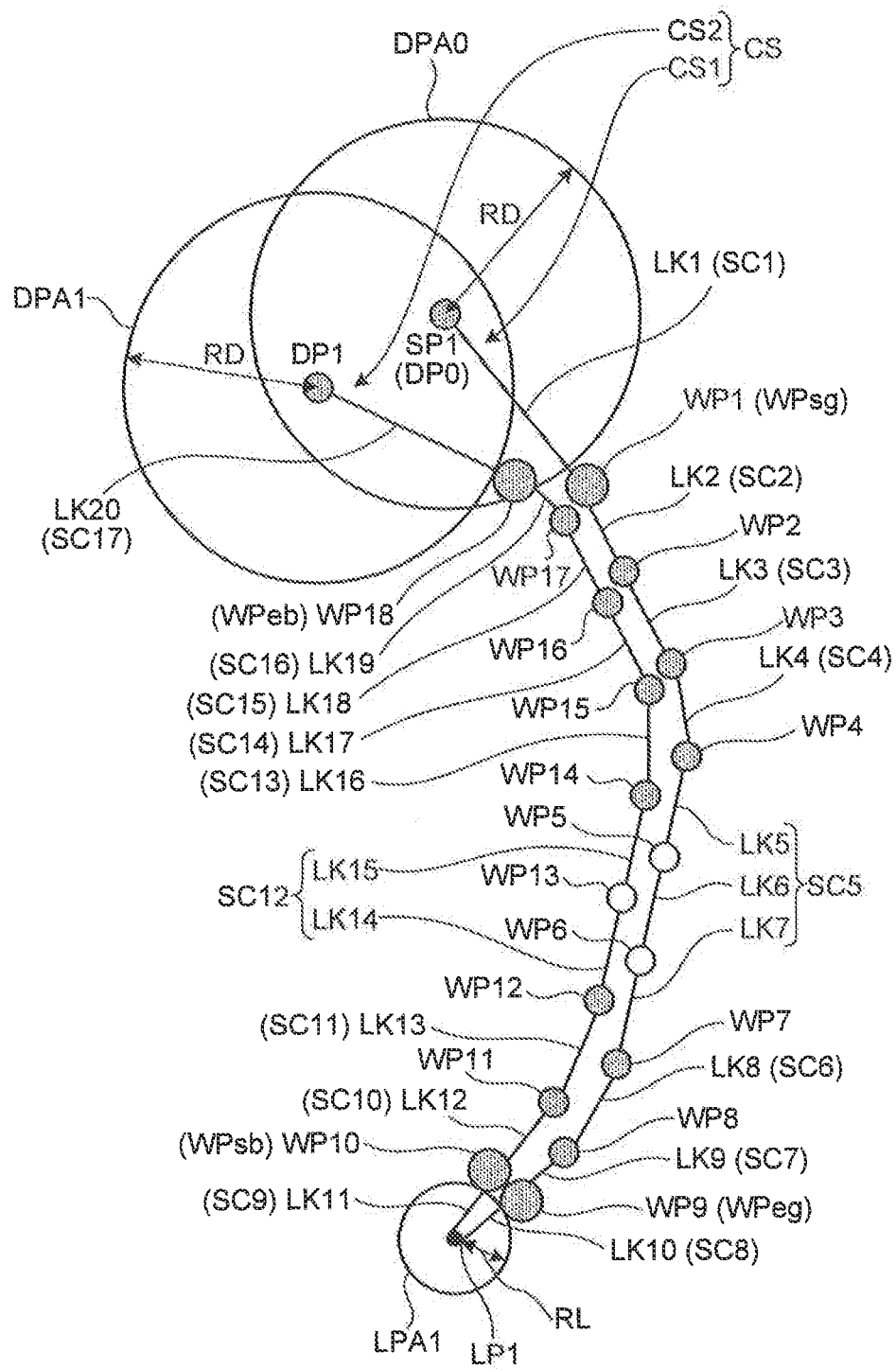
FIG. 6 is a diagram of exemplary items of information about a registered route according to the embodiment.

The registered route CS will be described, which is a comparative object for determining whether to match the actual traveling route when performing the route identification process. FIG. 6 is a diagram of an exemplary registered route CS. The registered route CS includes a going route CS1 and a returning route CS2. The starting point of the going route CS1 is a travel starting position SP1, and the end point is a loading position LP1. The starting point of the returning route CS2 is the loading position LP1, the end point is an unloading position DP1. The registered route CS includes a plurality of nodes, including the travel starting position SP1, the loading position LP1, the unloading position DP1 and a plurality of passage positions WP1 (WPsg), WP2, . . . WP9 (WPeg), WP10 (WPsb), WP11, . . . WP18 (WPeb), and links LK1, LK2, . . . LK20 that connect the nodes. On the registered route CS, the travel starting position SP1 corresponds to the first position, the loading position LP1 corresponds to the second position, and the unloading position DP1 corresponds to the third position.

The individual nodes, that is, the travel starting position SP1, the loading position LP1, the unloading position DP1 and a plurality of the passage positions WP1 (WPsg), WP2, . . . WP9 (WPeg) and the like correspond to items of position information PI included in the actual traveling route CSr. The node is a place expressed by the coordinates of a predetermined latitude, longitude, and altitude on the registered route CS. The links LK1, LK2, . . . LK20 connect nodes adjacent to each other. The going route CS1 of the registered route CS illustrated in FIG. 6 includes the travel starting position SP1, the loading position LP1, and a plurality of the passage positions WP1, WP2, . . . WP9 and the links LK1, LK2, . . . LK10 between the positions.

The returning route CS2 includes the loading position LP1, the unloading position DP1, and a plurality of the passage positions WP10, WP11, . . . WP18, and the links LK11, LK12, . . . LK20 between the positions. The registered route CS is a route on which the dump track 20 has actually traveled when the dump track 20 performs one cycle of the carrying operation. In this case, the travel starting position SP1 is an unloading position DP0 at which the dump track 20 has actually unloaded a load in an unloading site (in the following, appropriately referred to as a first unloading site) DPA0 before going to the loading position LP1. The unloading site DPA0 is a range (a first predetermined range) SPC1 of a predetermined radius RD where the travel starting position SP1 is the center. Similarly, an unloading site (in the following, appropriately referred to as a second unloading site) DPA1 is a range (a second predetermined range) of the predetermined radius RD where the unloading position DP1 is the center at which the dump track 20 loaded with a load at the loading position LP1 has unloaded the load. Moreover, a loading site LPA1 is a range of a predetermined radius RL where the loading position LP is the center. The travel starting position SP1 (the unloading position DP0) is a representative position that represents the unloading site DPA0, and the unloading position DP1 is a representative position that represents the unloading site DPA1.

The nodes, that is, the passage positions WP1, WP2, . . . WP18 exist on the registered route CS at every predetermined distance. The predetermined distance is provided at every 100 m, for example, which is not limited thereto in the embodiment. The passage position WP1 (WPsg) on the going route CS1 the closest to the unloading site DPA0 is provided on the outer side of the unloading site DPA0. The passage position WP18 (WPeb) on the returning route CS2 the closest to the unloading site DPA1 is provided on the outer side of the unloading site DPA1. The passage position WP9 (WPeg) on the going route CS1 the closest to the loading site LPA1 is provided on the outer side of the loading site LPA1. The passage position WP10 (WPsb) on the returning route CS2 the closest to the loading site LPA1 is provided on the outer side of the loading site LPA1.

Namely, the passage positions WP1, WP2, . . . WP18 included in the registered route CS are provided on the outer side of the unloading sites DPA0 and DPA1 and the loading site LPA1.

In the example illustrated in FIG. 6, the registered route CS includes a plurality of specific sections SC1, SC2, . . . SC17. The specific sections SC1, SC2, . . . SC17 are portions where the characteristics, the orientation and the gradient, for example, are recognized as almost the same in the registered route CS. A specific section including a plurality of the links is a portion in the registered route CS in which the difference in the gradient between the adjacent links is within a predetermined value, the difference in the orientation between the adjacent links is within a predetermined value, and a node to be an intersection is not included between the links. For example, three adjacent links LK5, LK6, and LK7 included in the specific section SC5 have the gradients within a range considered to be almost the same, that is, the difference in the gradient between the adjacent links is within a predetermined value, the difference in the orientation is within a predetermined value, and no intersection is included between the links. In FIG. 6, the intermediate nodes, that is, the passage positions WP5 and WP6 on the specific section SC5 are expressed by white circles, and these nodes are not intersections. The specific section SC12 is also similar to the specific section SC5. Moreover, when the difference in the gradient and the difference in the orientation between the adjacent links do not satisfy the conditions, only one link is considered to be the specific section. For example, although the specific section SC2 corresponds to the link LK2, the specific section SC2 is a specific section including one link. As described later, in the embodiment, the number of times of traveling, the traveling time, and operation information, for example, are totalized for individual specific sections. In the case where the operation state of a plurality of the dump track 20 is evaluated, the specific sections SC1, SC2, . . . SC17 are used to compare the state of the road surface on which the dump tracks 20 travel under the same conditions. It is noted that a plurality of different registered routes CS may include and share the same specific section.

The loading position LP1 and the unloading positions DP0 and DP1 are described in the LP/DP database 14RD stored on the management side storage device 13. The LP/DP database 14RD also includes the description of a range of the predetermined radius RD where the unloading positions DP0 and DP1 are the center, that is, a range of the predetermined radius RL where the unloading sites DPA0 and DPA1 and the loading position LP1 are the center, that is, information about the loading site LPA1, in addition to the loading position LP1 and the unloading positions DP0 and DP1. The passage positions WP1, WP2, . . . WP18 are described on the individual route WP database 14WP stored on the management side storage device 13. The specific sections SC1, SC2, . . . SC17 are described on the stored individual route specific section database 14SC stored on the management side storage device 13. In identifying the actual traveling route CSr of the dump track 20, the route determining unit 12a makes reference to information such as the LP/DP database 14RD, the individual route WP database 14WP, and the individual route specific section database 14SC to compare position information PI included in the actual traveling route CSr with position information about the nodes on the registered route stored on the registered route database 14CS.

After identifying the actual traveling route CSr, the operation information acquired on the actual traveling route CSr is combined as operation information on the registered route CS stored on the operation information database 14I, and totalized. Namely, in the case where the actual traveling route CSr is matched with the registered route CS, the operation information on the actual traveling route CSr is combined as the operation information on the registered route CS. In the case where a part of the specific section of the actual traveling route CSr is matched with the specific section of the registered route CS, the operation information on the actual traveling route CSr is stored on the operation information database as operation information on the registered route CS newly registered in association with the actual traveling route CSr, and combined as operation information on the specific section where the operation information on the specific section of the actual traveling route CSr is matched with the registered route CS. Moreover, in the case where the actual traveling route CSr is not matched with the registered route CS, the operation information on the actual traveling route CSr is stored on the operation information database as operation information on the registered route CS newly registered in association with the actual traveling route CSr. The operation information on the actual traveling routes CSr also includes a serial number of the dump track 20 that has traveled on the actual traveling route CSr, the ID number of the operator of the dump track 20, the ID number of the specific section included in the actual traveling route CSr, and operation information on the specific section, for example. Based on various these items of information, the operation information on the registered routes CS is further totalized for the individual dump tracks, the individual operators, and the individual specific sections.

Next, an exemplary process will be described for evaluating operations from the viewpoints of production efficiency and fuel consumption, for example, based on various items of operation information acquired on the identified actual traveling route CSr in the management method for a mining machine according to the embodiment.

In the embodiment, the management side processor 12 of the management apparatus 10 is to perform the operation evaluation process. It is noted that the on processor 30 of the dump track 20 may perform the operation evaluation process, or both of the management side processor 12 and the on-vehicle processor 30 may perform the operation evaluation process. Moreover, in the embodiment, the management side storage device 13 of the management apparatus 10 is to store various items of data of the operation evaluation process. It is noted that the on-vehicle storage device 31 of the dump track 20 or both of the management side storage device 13 and the on-vehicle storage device 31 may store various items of data of the operation evaluation process.

<The Evaluation of the Operation for the Individual Routes>

Next, an exemplary evaluation for operations will be described. In the embodiment, a plurality of the registered routes (in the following, appropriately referred to as the route) CS (CSa, CSb, CSc, . . . ) is provided on the mine, and operation information about the dump track 20 is individually acquired for the plurality of the routes CS.

Figure 7:
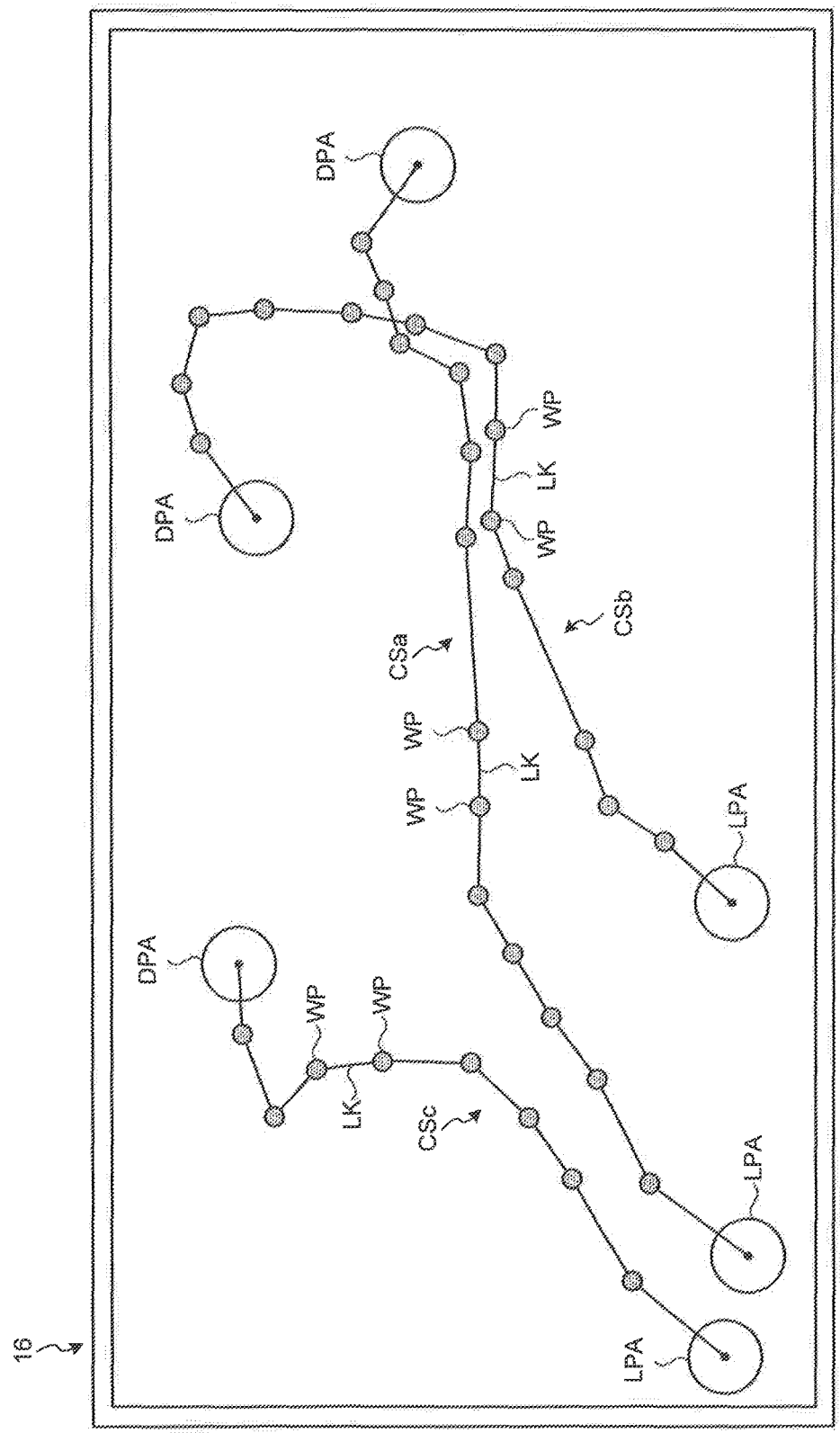
FIG. 7 is a diagram of an exemplary screen of a display device according to the embodiment.

FIG. 7 is an exemplary screen of the display device 16 according to the embodiment. In the embodiment, a predetermined route identification process is performed to denitrify a plurality of the routes CS (CSa, CSb, CSc, . . . ). The display device 16 displays the course list of a plurality of the routes CS on an image illustrated in FIG. 13. For example, in the case where three routes CSa, CSb, and CSc are identified in the mine, the display device 16 displays the routes CSa, CSb, and CSc on an image seen perpendicularly from above as illustrated in FIG. 7. The routes CSa, CSb, and CSc are shown in an image using a plurality of nodes (the passage positions WP, for example) disposed at a predetermined distance and a plurality of the links LK connecting between the adjacent nodes. It is noted that all or a part of the route CS to be an evaluation target may be displayed on the display device 16, or a part of a route CS in a plurality of the routes CS to be evaluation targets may not be displayed.

In the embodiment, the management side processor 12 derives indices of the production efficiency of the dump track 20 on a plurality of the routes CS for evaluation. In the embodiment, the indices of the production efficiency of the dump track 20 on the route CS are the amount of fuel consumed per unit time of a plurality of the dump tracks 20 that have traveled on the routes CS, the transport load per unit time of a plurality of the dump tracks 20 that have traveled on the routes CS, and the transport load per unit amount of fuel consumed of a plurality of the dump tracks 20 that have traveled on the routes CS. It is noted that in the embodiment, an example is shown in which indices of a plurality of the dump tracks 20 that have traveled on the routes are found. However, the indices of one dump track 20 selected may be found.

The amount of fuel consumed per unit time is an index indicating the fuel consumption efficiency of the dump track 20. The transport load per unit time is an index indicating the productivity of the dump track 20. The transport load per unit amount of fuel consumed is an index indicating the fuel consumption productivity of the dump track 20, in other words, the production efficiency.

The amount of fuel consumed per unit time (L/h) of the dump track 20 for the individual routes CS is found as below, for example. The required traveling time (h) and the amount of fuel consumed (L) for every one cycle are found for the individual routes CS based on the time information measured during a travel on the route, which is the operation information for the individual routes CS stored on the operation information database 14I, and the fuel injection quantity of the fuel injector 34F, and the amount of fuel consumed per unit time (L/h) is found in the individual cycles from the required traveling time (h) and the amount of fuel consumed (L) for every one cycle. Subsequently, the mean value of the amount of fuel consumed per unit time (L/h) in the individual cycles is found on the routes CS, and this is considered to be the amount of fuel consumed per unit time (L/h) of the dump track 20 for the individual routes CS.

Moreover, the transport load per unit time (ton/h) of the dump track 20 for the individual routes CS is found as below, for example. The required traveling time (h) and the transport load (ton) for every one cycle is found for the individual routes CS based on event occurrence time information measured during a travel on the route, which is operation information for the individual routes CS stored on the operation information database 14I, and the transport load, and the transport load per unit time (ton/h) in the individual cycles is found from the required traveling time (h) and the transport load (ton) for every one cycle. Subsequently, the mean value of the transport load per unit time (ton/h) in the individual cycles is found on the routes CS, and this is considered to be the transport load per unit time (ton/h) of the dump track 20 for the individual routes CS.

Furthermore, the transport load per unit amount of fuel consumed (ton/L) of the dump track 20 for the individual routes CS is found as below, for example. The transport load (ton) and the amount of fuel consumed (L) for every one cycle is found for the individual routes CS based on the transport load, which is the operation information for the individual routes CS stored on the operation information database 14I, and the fuel injection quantity, and the transport load per unit amount of fuel consumed (ton/L) in the individual cycles is found from the transport load (ton) and the amount of fuel consumed (L) for every one cycle. Subsequently, the mean value of the transport load per unit amount of fuel consumed (ton/L) in the individual cycles is found on the routes CS, and this is considered to be the transport load per unit amount of fuel consumed (ton/L) of the dump track 20 for the individual routes CS. It is noted that the transport load per unit amount of fuel consumed (ton/L) may be found from arithmetic operation processes based on the amount of fuel consumed per unit time (L/h) and the transport load per unit time (ton/h).

Figure 8:
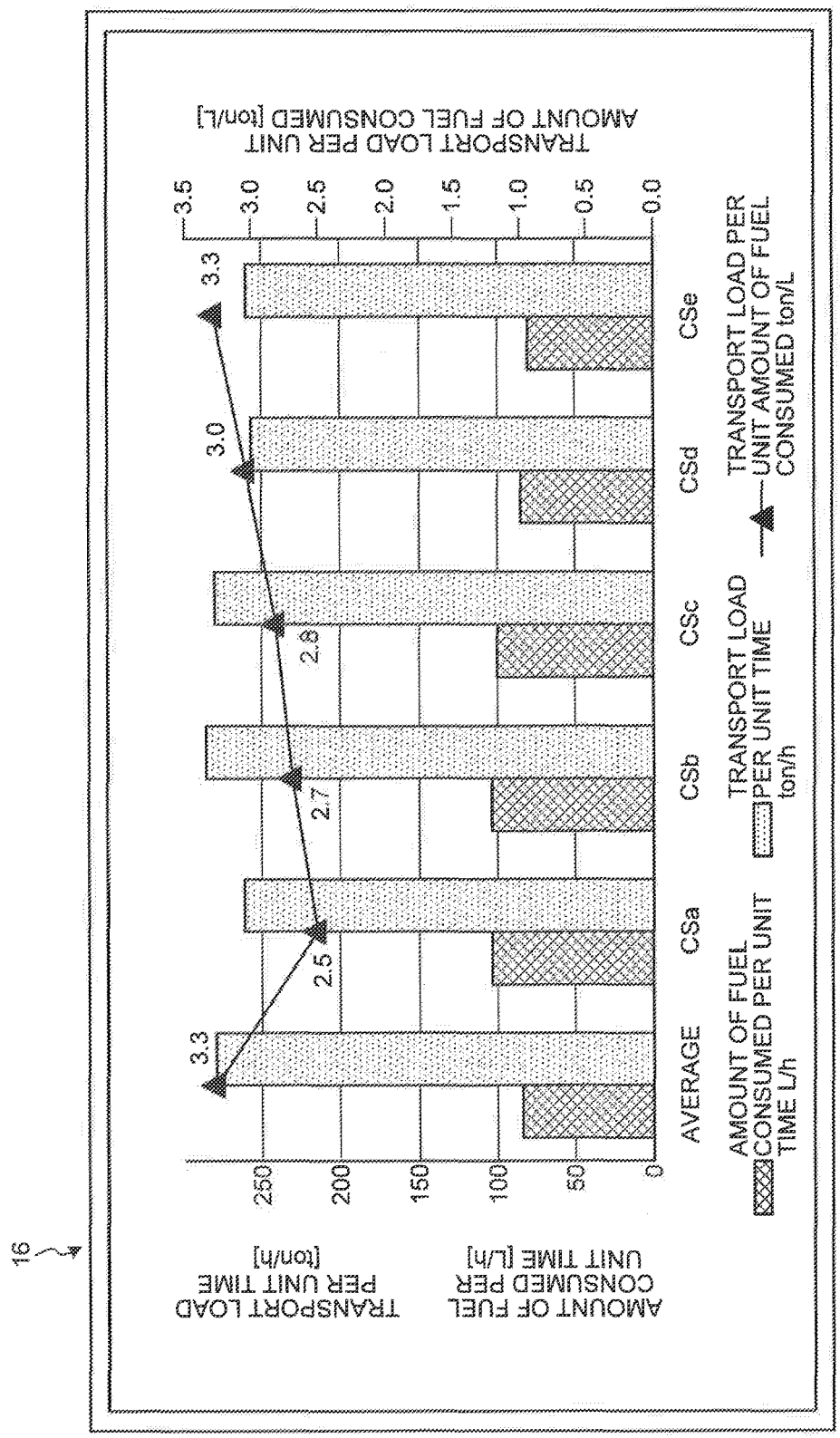
FIG. 8 is a diagram of an exemplary screen of the display device according to the embodiment.

FIG. 8 is an exemplary screen of the display device 16 according to the embodiment. In the example illustrated in FIG. 8, the case is illustrated where the routes CSa, CSb, CSc, CSd, and CSe are identified in the mine, in which the indices of the production efficiency of the dump track 20 are displayed in association with a plurality of the routes CS (CSa, CSb, CSc, CSd, and CSe). In the embodiment, the display device 16 displays the indices of the production efficiency of the dump track 20 in a graph (a bar graph and a line graph).

In the graph illustrated in FIG. 8, the vertical axis expresses the amount of fuel consumed per unit time (L/h) of the dump track 20, the transport load per unit time (ton/h), and the transport load per unit amount of fuel consumed (ton/L). Here, h expresses hours, L expresses liters, and ton expresses tons. The horizontal axis expresses a plurality of the routes CSa, CSb, CSc, CSd, and CSe and the mean value of the plurality of the routes CS.

The numeric value of the graph of the route CSa may be the mean values of the indices for a plurality of the dump tracks 20 in the cycles when a plurality of the dump tracks 20 travels on the route CSa, or may be the mean values of the indices in the cycles when a certain dump track 20 travels on the route CSa. The same thing is also applied to the other routes CSb, CSc, CSd, and CSe.

It is noted that the image illustrated in FIG. 7 and the image illustrated in FIG. 8 may be displayed on the same display device 16, or may be individually displayed on different display devices 16. Moreover, the image illustrated in FIG. 7 and the image illustrated in FIG. 8 may be simultaneously displayed on the same display device 16, or may be displayed at different timings.

Figure 9:
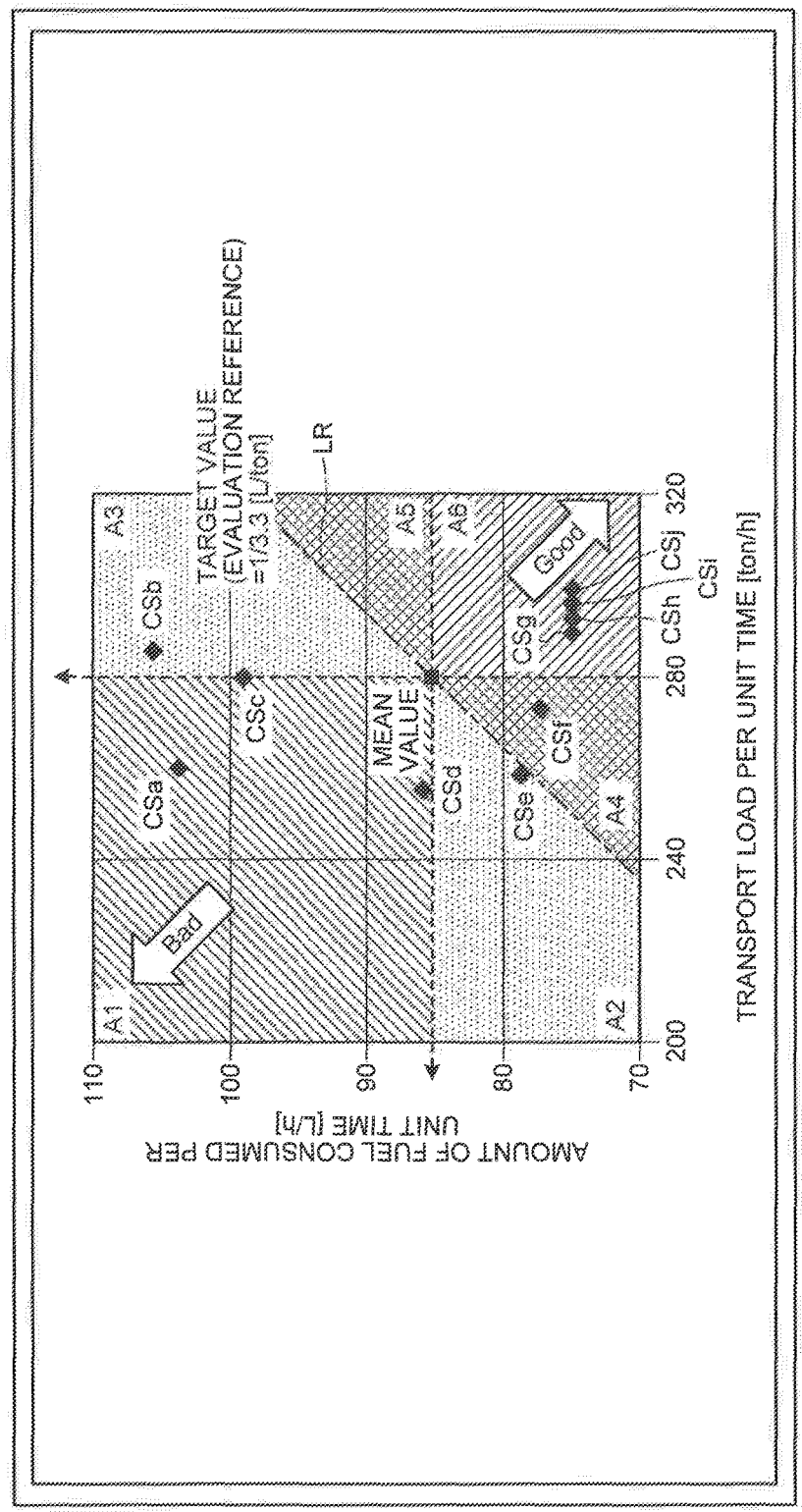
FIG. 9 is a diagram of an exemplary screen of the display device according to the embodiment.

FIG. 9 is an exemplary screen of the display device 16 according to the embodiment, illustrating other examples of indications of the indices of the production efficiency of the dump track 20. In the embodiment, it is assumed that a plurality of the routes CSa, CSb, CSc, CSd, CSe, CSf, CSg, CSh, CSi, and CSj are identified.

It is noted that the image illustrated in FIG. 9 and at least one of the image illustrated in FIG. 7 and the image illustrated in FIG. 8 may be displayed on the same display device 16, or may be individually displayed on different display devices 16. Moreover, the image illustrated in FIG. 9 and at least one of the image illustrated in FIG. 7 and the image illustrated in FIG. 8 may be simultaneously displayed on the same display device 16, or may be displayed at different timings.

In FIG. 9, the display device 16 displays a two-dimensional graph, in which the amount of fuel consumed per unit time (L/h) and the transport load per unit time (ton/h), which are ones of the indices of the production efficiency, are plotted on the vertical axis and the horizontal axis, respectively, and the origin point expresses the mean values of the indices on the vertical axis and the horizontal axis for a plurality of the routes CSa, CSb, CSc, CSd, CSe, CSf, CSg, CSh, CSi, and CSj. Namely, the origin point is a point expressing the mean value of the amount of fuel consumed per unit time and a point expressing the mean value of the transport load per unit time of the dump track 20 that has traveled on a plurality of the routes CSa, CSb, CSc, CSd, CSe, CSf, CSg, CSh, CSi, and CSj.

The two-dimensional graph illustrated in FIG. 9 displays a line LR indicating the transport load per unit amount of fuel consumed to be a reference of the evaluation of production efficiency, and displays a plurality of points indicating the values of the indices on the vertical axis and the horizontal axis for a plurality of the routes CSa, CSb, CSc, CSd, CSe, CSf, CSg, CSh, CSi, and CSj. The values of the indices at the points on the vertical axis and the horizontal axis are the mean value of the amount of fuel consumed per unit time (L/h) in the individual cycles on the routes CS (CSa, CSb, CSc, CSd, CSe, CSf, CSg, CSh, CSi, and CSj) and the mean value of the transport load per unit time (ton/h) in the individual cycles on the routes CS.

The line LR is a linear line. In the embodiment, the line LR indicates the reciprocal (L/ton) of the transport load per unit amount of fuel consumed at the dump track 20. Namely, the line LR indicates the amount of fuel consumed per unit transport load of the dump track 20. In the graph, the production efficiency of the dump track 20 is poorer as the inclination of the line LR is greater.

Based on the two-dimensional graph illustrated in FIG. 9, production efficiency is evaluated by evaluating the operation of the dump track 20 for a plurality of the individual routes CS (CSa, CSb, CSc, CSd, CSe, CSf, CSg, CSh, CSi, and CSj). In the graph illustrated in FIG. 9, it is evaluated that production efficiency is highly excellent on the dump track 20 that has traveled on the route CS having a performance in which a larger amount of a transport load is carried with a smaller amount of fuel consumed in a plurality of the routes CS. Namely, in the graph illustrated in FIG. 9, it can be evaluated that the production efficiency is excellent on the dump track 20 that has traveled on the routes CS where the points are positioned in the areas A4, A5, and A6 on the lower side of the line LR. On the other hand, it can be evaluated that production efficiency is poor on the dump track 20 that has traveled on the routes CS where the points are positioned in areas A1, A2, and A3 on the upper side of the line LR. In the example illustrated in FIG. 9, it can be evaluated that production efficiency is the most excellent on the dump track 20 that has traveled on the routes CSg, CSh, CSi, and CSj where the points are positioned in the area A6, and it can be evaluated that production efficiency is second excellent on the dump track 20 that has traveled on the route CSf where the point is positioned in the areas A4 and A5 to the production efficiency of the dump track 20 that travels on the route CS where the point is positioned in the area A6. Moreover, it can be evaluated that production efficiency is second excellent on the dump track 20 that has traveled on the routes CSb and CSe where the points are positioned in the areas A2 and A3 to the production efficiency of the dump track 20 that has traveled on the route CSf where the point is positioned in the areas A4 and A5. It can be evaluated that production efficiency is the poorest on the dump track 20 that has traveled on the routes CSa, CSc, and CSd where the points are positioned in the area A1.

It is noted that in the two-dimensional graph illustrated in FIG. 9, the area A6 corresponds to the fourth quadrant of the graph, the area A1 corresponds to the second quadrant of the graph, the areas A3 and A5 correspond to the first quadrant of the graph, and the areas A2 and A4 correspond to the third quadrant of the graph.

In the graph illustrated in FIG. 9, for example, it is evaluated that production efficiency is poor on the dump track 20 that has traveled on the routes CSa, CSc, and CSd where the points are positioned in the area A1 because the transport load is small although the amount of fuel consumed is large. Based on data on the graph illustrated in FIG. 9, it can be evaluated (it can be predicted) that the cause why the production efficiency of the dump track 20 is poor is resulted from the drive manipulation technique (the manipulation technique) of the operator of the dump track 20 that has traveled on the routes CSa, CSc, and CSd or from the road surface states of the routes CSa, CSc, and CSd, for example.

In the graph illustrated in FIG. 9, for example, it is evaluated that the amount of fuel consumed is small and the transport load is small as well on the dump track 20 that has traveled on the route where the point is positioned in the area A2. Based on the evaluation, for example, it is determined that the cause why the production efficiency of the dump track 20 is poor is resulted from a too-small loadage on the dump track 20 that has traveled on the route CSe or from a long down time of the dump track 20, for example, so that the drive manipulation of the operator can be guided to improve the cause.

In the graph illustrated in FIG. 9, for example, it is evaluated that the transport load is large and the amount of fuel consumed is large as well on the dump track 20 that has traveled on the route CSb where the point is positioned in the area A3. Based on the data, for example, it is determined that the cause why the production efficiency is poor is resulted from a too-large loadage on the dump track 20 that has traveled on the route CSb (the load is overloaded) or from the drive manipulation technique (the manipulation technique) of the operator of the dump track 20, so that the drive manipulation of the operator can be guided to improve the cause.

As described above, based on the graph illustrated in FIG. 9, for example, the manager can quickly and smoothly evaluate the superiority of the production efficiency of the dump track 20 for a plurality of the individual routes CS (simultaneous improvement of productivity and fuel consumption). For example, it can be quickly grasped what degree the indices of the production efficiency of the dump track 20 that has traveled on a plurality of the routes CS are superior to the mean values of the indices of the production efficiency of a plurality of the routes CS (that is, the origin point on the graph illustrated in FIG. 9) and the line LR indicating the evaluation reference. Moreover, whether the cause why the production efficiency of the dump track 20 is poor is resulted from the transport load or the amount of fuel consumed can be grasped at a glance, so that it is possible to quickly investigate schemes for solving the problem and conduct the schemes.

In the example illustrated in FIG. 9, the indices of the production efficiency for the individual routes CS are plotted on a two-dimensional graph. However, the indices of the production efficiency may be plotted based on the traveling performance of the route CS for the individual operators. Thus, it is also possible to evaluate the drive manipulation for the individual operators, and it is possible to easily investigate schemes for solving problems on the drive manipulation.

It is noted that based on data on the graph illustrated in FIG. 9, the management side processor 12 may automatically evaluate the production efficiency of the dump track 20 for a plurality of the individual routes CS. At this time, the evaluation result may be printed as an evaluation report out of the printing device 19.

It is noted that in the graph illustrated in FIG. 9, the vertical axis may express the transport load per unit time and the horizontal axis may express the amount of fuel consumed per unit time. In this case, the superiority of evaluation on the production efficiency of the quadrants of the two-dimensional graph is inverted to the example in FIG. 9 as the origin point is in the center.

Moreover, the content on the display illustrated in FIGS. 7, 8, and 9 may be printed using the printing device 19. Namely, it may be fine that the evaluation described above is performed based on the graph outputted from the display device 16 or the printing device 19.

<The Evaluation of Operation Information in the Specific Section of the Route>

Next, the detailed evaluation is performed on the route CS which is evaluated that the production efficiency is the poorest in a plurality of the routes CS as described above. In the embodiment, for an example, the detailed evaluation will be described on the route CSa which is evaluated that the production efficiency is the poorest in the evaluation described with reference to FIG. 9. In the embodiment, a process for detailedly evaluating causes why the production efficiency of the route CSa is poor is performed.

In the embodiment, the operation of the dump track 20 in the specific section SC of the route CSa is evaluated. The specific section SC is a section including the same characteristics (the tilt angle and a gradient angle, for example) in the routes CS.

Figure 10:
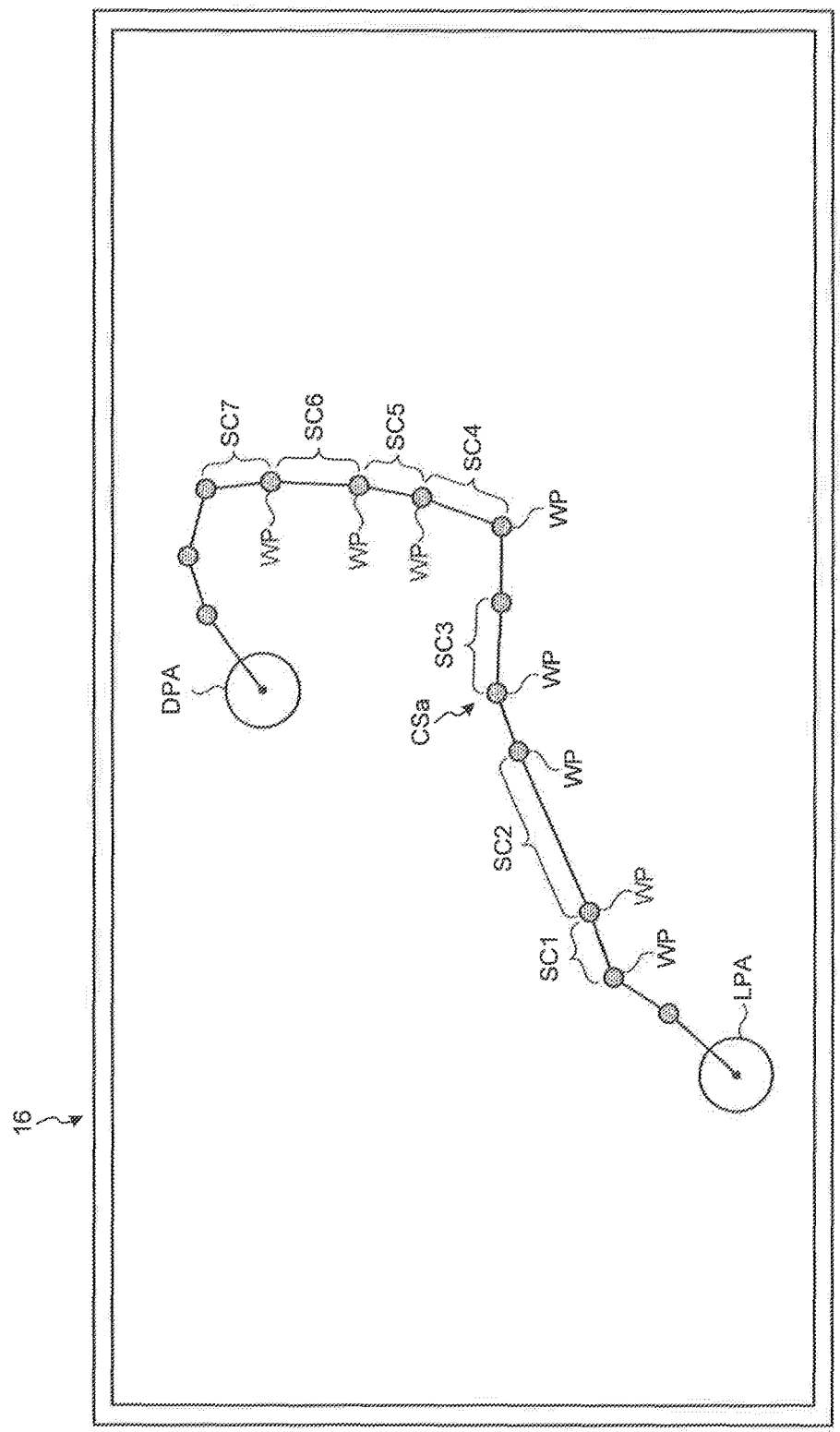
FIG. 10 is a diagram of an exemplary screen of the display device according to the embodiment.

FIG. 10 is an exemplary screen of the display device 16 according to the embodiment. As illustrated in FIG. 10, the display device 16 displays the route CSa of the evaluation target in an image, and the route CSa includes a plurality of specific sections SC.

In the embodiment, the management side processor 12 derives and evaluates operation information about the dump track 20 for the evaluation target on a plurality of the specific sections SC in the route CSa. In the embodiment, for an example of operation information of the evaluation target, at least one of the amount of fuel consumed, the traveling time, the down time (stoppage time), and the amount of fuel consumed per unit time is derived and evaluated. Moreover, for other examples of operation information of the evaluation target, at least one of the stoppage frequency, the deceleration frequency, the traveling time by inertia, and the gradient (the slope) of the route is derived and evaluated. How to find these items of operation information is as described above.

Figure 11:
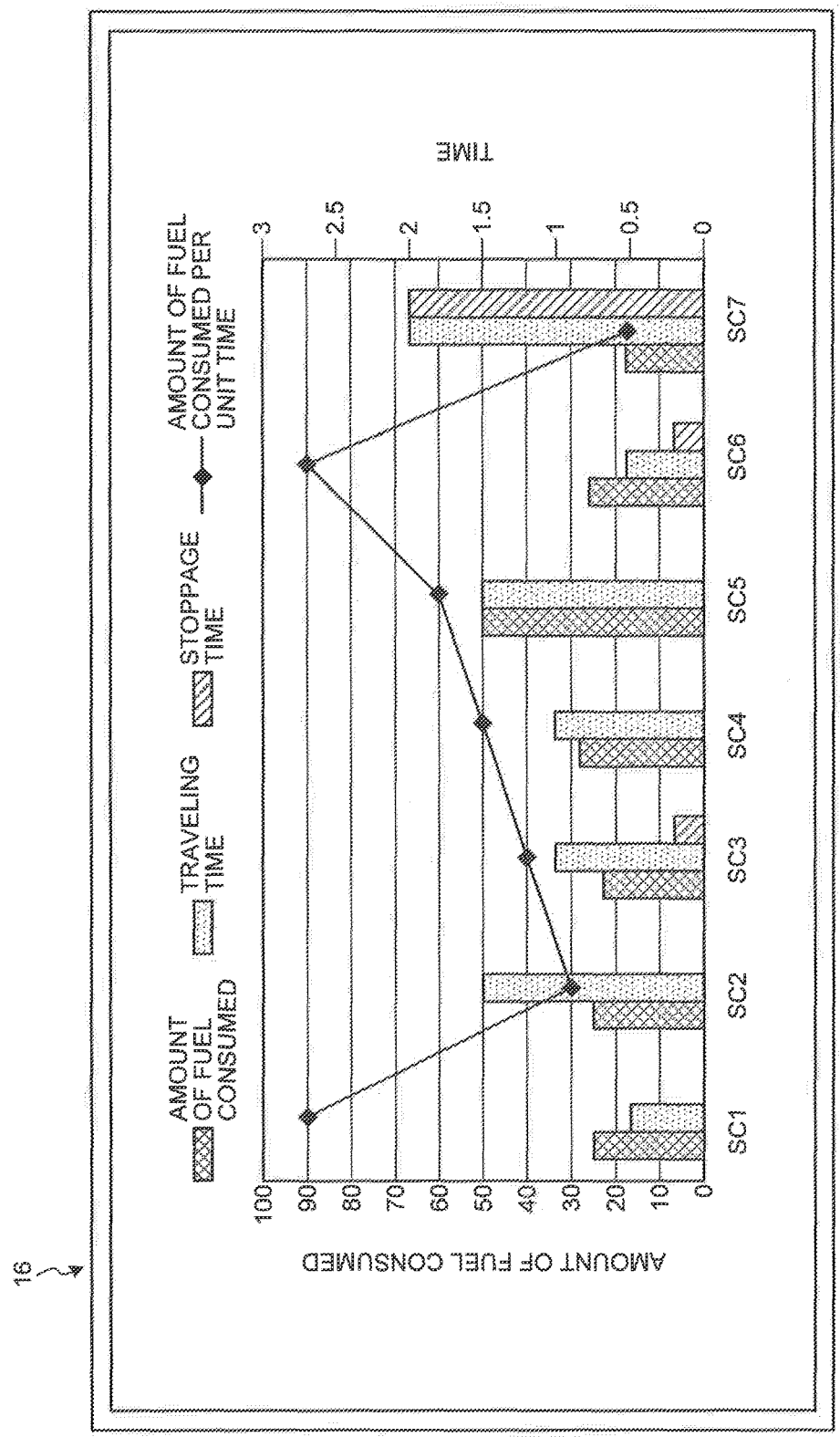
FIG. 11 is a diagram of an exemplary screen of the display device according to the embodiment.
Figure 12:
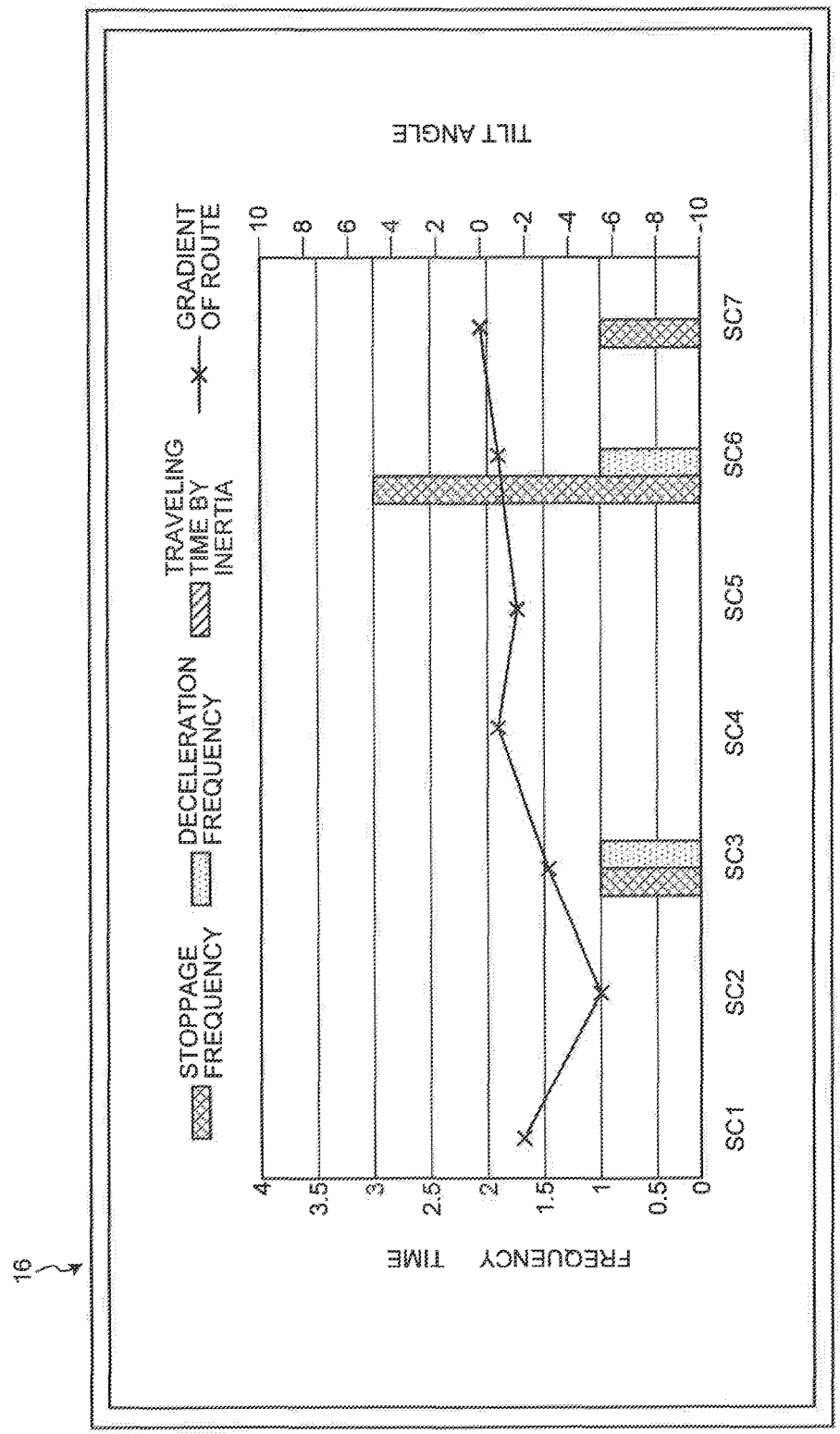
FIG. 12 is a diagram of an exemplary screen of the display device according to the embodiment.

FIGS. 11 and 12 are an exemplary screen of the display device 16 according to the embodiment. As illustrated in FIGS. 11 and 12, the display device 16 displays the operation information of the evaluation target in association with a plurality of the specific sections SC (SC1, SC2, SC3, SC4, SC5, SC6, and SC7) of the route CSa, which is displayed in a graph (a bar graph and a line graph) in the embodiment.

FIG. 11 is the amount of fuel consumed, the traveling time, the stoppage time, and the amount of fuel consumed per unit time for the individual specific sections SC (SC1, SC2, SC3, SC4, SC5, SC6, and SC7). In the graph illustrated in FIG. 11, the vertical axis expresses the amount of fuel consumed (including the amount of fuel consumed per unit time), and time. The amount of fuel consumed for the individual specific sections SC is the mean value of the amount of fuel consumed in the specific sections for every one cycle, the traveling time for the individual specific sections SC is the mean value of the traveling time in the specific sections for every one cycle, the stoppage time for the individual specific sections SC is the mean value of the total stoppage time in the specific sections for every one cycle, and the amount of fuel consumed per unit time for the individual specific sections SC is the mean value of the amount of fuel consumed per unit time in the specific sections for every one cycle.

FIG. 12 is the stoppage frequency, the deceleration frequency, the traveling time by inertia, and the gradient (the slope) of the route on the specific section SC for the individual specific sections SC (SC1, SC2, SC3, SC4, SC5, SC6, and SC7). In the graph illustrated in FIG. 12, the vertical axis expresses the frequency (the number of times) of stoppage or deceleration of the dump track 20, time, and the tilt angle. The stoppage frequency for the individual specific sections SC is the mean value of the number of times of stoppage in the specific sections for every one cycle, the deceleration frequency for the individual specific sections SC is the mean value of the number of times of deceleration in the specific sections for every one cycle, the traveling time by inertia for the individual specific sections SC is the mean value of the traveling time by inertia in the specific sections for every one cycle, and the gradient (the slope) of the route for the individual specific sections SC is the mean value of the measured value of the gradient (the slope) in the specific sections for every one cycle.

The numeric value of the graph of the route CSa may be the mean value of operation information when a plurality of the dump tracks 20 travels on the specific section SC1, or may be the mean value of operation information when one dump track 20 travels on the specific section SC1. The same thing is also applied to the specific section SC2, SC3, SC4, SC5, SC6, and SC7.

It is noted that the image illustrated in FIG. 11 and the image illustrated in FIG. 12 may be displayed on the same display device 16, or may be individually displayed on different display devices 16. Moreover, the image illustrated in FIG. 11 and the image illustrated in FIG. 12 may be simultaneously displayed on the same display device 16, or may be displayed at different timings.

For example, as illustrated in FIG. 11, in a plurality of the specific sections SC, the amount of fuel consumed per unit time of the dump track 20 is large in the specific sections SC1 and SC6. Therefore, based on the data on the graph illustrated in FIG. 11, it can be evaluated that the cause why the amount of fuel consumed per unit time on the route CSa is large is the traveling state of the dump track 20 in the specific sections SC1 and SC6 of the route CS, for example. Moreover, as illustrated in FIG. 12, the stoppage frequency and deceleration frequency of the dump track 20 in the specific section SC6 are high in a plurality of the specific sections SC. Therefore, based on the data on the graphs illustrated in FIGS. 11 and 12, it can be evaluated that the cause why the amount of fuel consumed of the dump track 20 traveling on the specific section SC6 is large is a high stoppage frequency and deceleration frequency. In the case where it is evaluated (determined) that the cause why the stoppage frequency and deceleration frequency is high is the drive manipulation technique (the manipulation technique) of the operator of the dump track 20 traveling on the route CSa (the specific section SC6), it is possible to take appropriate measures such as improving the drive manipulation of the operator technique.

It is noted that the evaluation of operation information (the indices for production efficiency) about the dump track 20 traveling on the route CS and the evaluation of operation information about the dump track 20 in the specific section SC of the route CS may be performed for every one cycle, or may be performed on the going route and the returning route. In the evaluation of the going route, the evaluation can be performed in the state in which there is no load on the vessel 22 (with an empty load). In the evaluation of the returning route, the evaluation can be performed in the state in which there is a load on the vessel 22 (with a load).

As described above, the evaluation of operation information in the specific section SC of the route CSa is described. The same thing is also applied to the evaluation of operation information in the specific sections SC of the route CSb, the route CSc, . . . the route CSj.

It is noted that the example is described where the target to be evaluated based on the graph illustrated in FIGS. 11 and 12 is the route CSa which is evaluated that the production efficiency is the poorest in a plurality of the routes CS. However, the example is not limited thereto. The target to be evaluated based on the graph illustrated in FIGS. 11 and 12 may be a specific route selected.

It is noted that the content on the display illustrated in FIGS. 10, 11, and 12 may be printed using the printing device 19. Namely, it may be fine that the evaluation described above is performed based on the graph outputted from the display device 16 or the printing device 19.

<The Evaluation of the Operation for a Plurality of the Individual Dump Tracks>

In the foregoing embodiment, the example is described where operation information about the dump track 20 is evaluated on a plurality of the individual routes CS in the mine. In the mine, a plurality of the dump tracks 20 operates. The management side processor 12 may derive and evaluate the indices of the production efficiency of a plurality of the individual dump tracks 20. The indices of the production efficiency of a plurality of the individual dump tracks 20 include at least one of the amount of fuel consumed per unit time, the transport load per unit time, and the transport load per unit fuel amount of a plurality of the dump tracks 20.

For example, in the case where a plurality of the dump tracks 20a, 20b, 20c, 20d, and 20e operates in the mine, the management side processor 12 derives and evaluates the indices of the production efficiency for the individual dump track 20a, 20b, 20c, 20d, and 20e.

Figure 13:
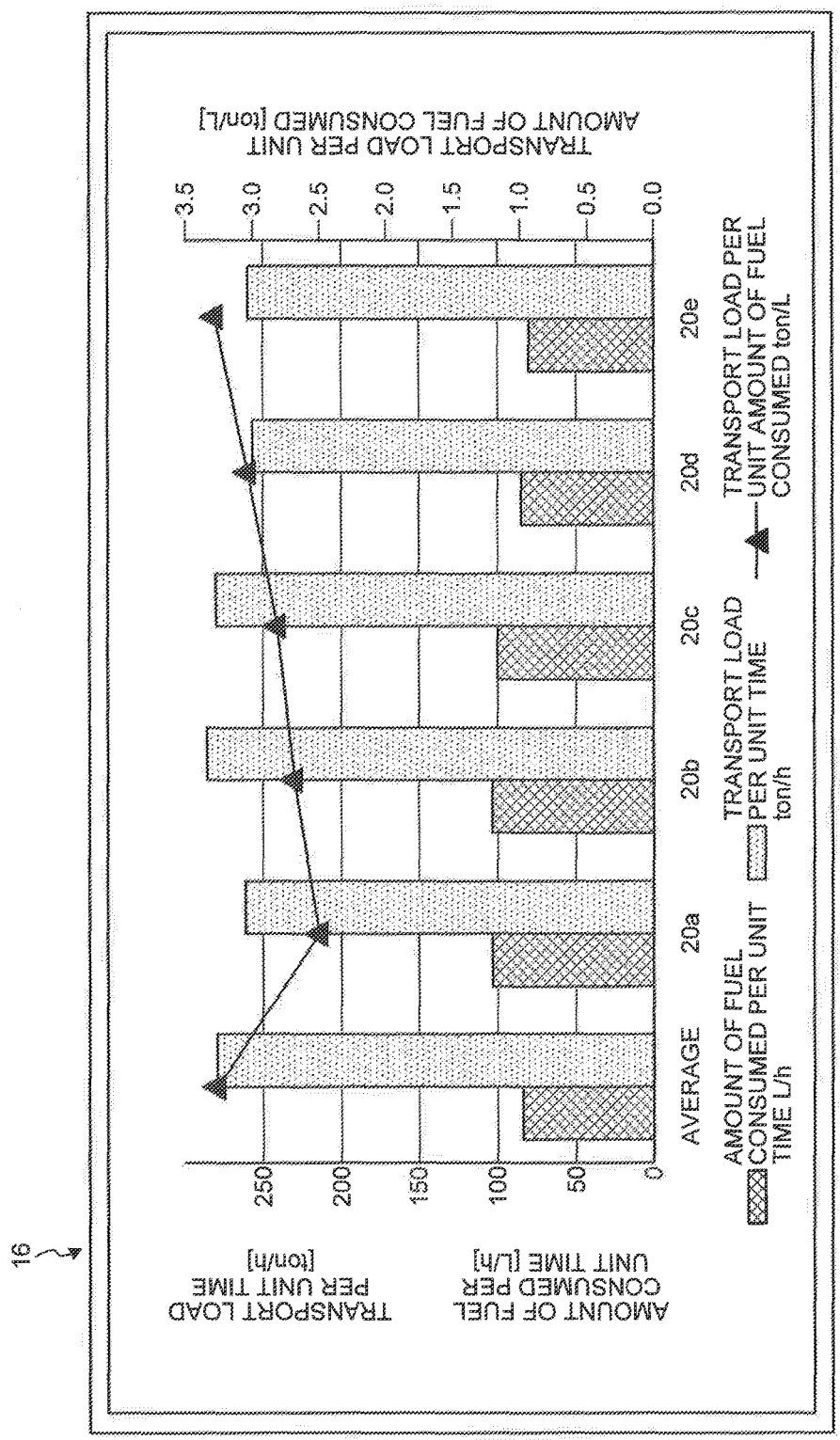
FIG. 13 is a diagram of an exemplary screen of the display device according to the embodiment.

FIG. 13 is an exemplary screen of the display device 16 according to the embodiment. In the example illustrated in FIG. 13, the indices of the production efficiency of the dump track 20 are individually displayed in association with a plurality of the dump tracks 20 (20a, 20b, 20c, 20d, and 20e). In the embodiment, the display device 16 displays the indices of the production efficiency of the dump track 20 in a graph (a bar graph and a line graph).

In the graph illustrated in FIG. 13, the vertical axis expresses the amount of fuel consumed per unit time (L/h) of the dump track 20, the transport load per unit time (ton/h), and the transport load per unit amount of fuel consumed (ton/L). Here, h expresses hours, L expresses liters, and ton expresses tons. The horizontal axis expresses a plurality of the dump tracks 20 (20a, 20b, 20c, 20d, and 20e) and the mean value of a plurality of the dump tracks 20.

The numeric values of the graphs of a plurality of the dump tracks 20 (20a, 20b, 20c, 20d, and 20e) may be the mean values of the indices for a plurality of the dump tracks 20 in the cycles when a plurality of the dump tracks 20 travels on the same route CS, or may be the mean values of the indices for a plurality of the dump tracks 20 in the cycles for the individual routes CS when a plurality of the dump tracks 20 travels on different routes CS. Moreover, the numeric values of the graphs of a plurality of the dump tracks 20 (20a, 20b, 20c, 20d, and 20e) may be the indices when a certain dump track 20a travels on the route CS once, for example, or may be the mean values of the indices of the same route CS in the cycles when a certain dump track 20a travels on the same route CS for a plurality of cycles. The same thing is also applied to the other dump track 20b, 20c, 20d, and 20e.

Figure 14:
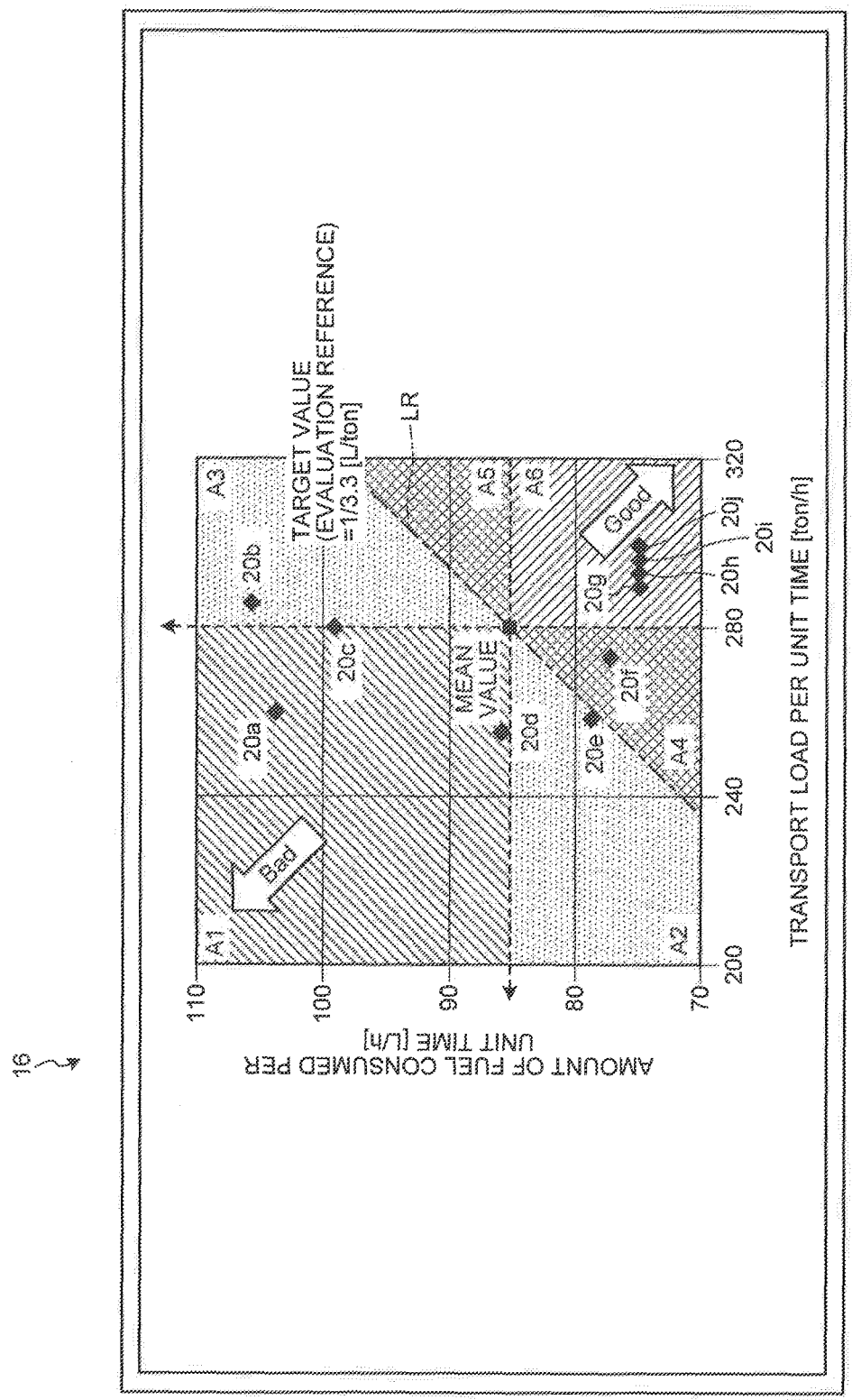
FIG. 14 is a diagram of an exemplary screen of the display device according to the embodiment.

FIG. 14 is an exemplary screen of the display device 16 according to the embodiment, illustrating other examples of indications of the indices of the production efficiency of the dump track 20. The indices are individually displayed in association with a plurality of the dump tracks 20 (20a, 20b, 20c, 20d, 20e, 20f, 20g, 20h, 20i, and 20j).

It is noted that the image illustrated in FIG. 14 and the image illustrated in FIG. 13 may be displayed on the same display device 16, or may be individually displayed on different display devices 16. Moreover, the image illustrated in FIG. 14 and the image illustrated in FIG. 13 may be simultaneously displayed on the same display device 16, or may be displayed at different timings.

In FIG. 14, the display device 16 displays a two-dimensional graph, in which the vertical axis expresses the amount of fuel consumed per unit time, which is one of the indices of the production efficiency, the horizontal axis expresses the transport load per unit time, and the origin point expresses the mean values of the indices on the vertical axis and the horizontal axis for a plurality of the dump tracks 20 (20a, 20b, 20c, 20d, 20e, 20f, 20g, 20h, 20i, and 20j). Namely, the origin point is a point expressing the mean value of the amount of fuel consumed per unit time and a point expressing the mean value of the transport load per unit time of a plurality of the dump tracks 20a, 20b, 20c, 20d, 20e, 20f, 20g, 20h, 20i, and 20j.

The two-dimensional graph illustrated in FIG. 14 displays a line LR indicating the transport load per unit amount of fuel consumed to be a reference of the evaluation of production efficiency and displays a plurality of points indicating the values of the indices on the vertical axis and the horizontal axis for a plurality of the dump tracks 20a, 20b, 20c, 20d, 20e, 20f, 20g, 20h, 20i, and 20j. The values of the indices at the points on the vertical axis and the horizontal axis are the mean value of the amount of fuel consumed per unit time (L/h) of the dump tracks 20 in the cycles (20a, 20b, 20c, 20d, 20e, 20f, 20g, 20h, 20i, and 20j) and the mean value of the transport load per unit time (ton/h) of the dump tracks 20 in the cycles.

Similarly to the example illustrated in FIG. 9, the line LR is a linear line, indicating the reciprocal (L/ton) of the transport load per unit amount of fuel consumed at the dump track 20. Namely, the line LR indicates the amount of fuel consumed per unit transport load of the dump track 20. In the graph, the production efficiency of the dump track 20 is poorer as the inclination of the line LR is greater.

Based on the two-dimensional graph illustrated in FIG. 14, production efficiency is evaluated by operation evaluation for a plurality of the individual dump tracks 20 (20a, 20b, 20c, 20d, 20e, 20f, 20g, 20h, 20i, and 20j). In the graph illustrated in FIG. 14, in a plurality of the dump tracks 20, it is evaluated that the production efficiency is highly excellent on the dump track 20 having a performance in which a larger amount of a transport load is carried with a smaller amount of fuel consumed. Namely, in the graph illustrated in FIG. 14, it can be evaluated that production efficiency is excellent on the dump track 20 where the points are positioned in the areas A4, A5, and A6 on the lower side of the line LR. On the other hand, it can be evaluated that production efficiency is poor on the dump track 20 where the points are positioned in areas A1, A2, and A3 on the upper side of the line LR. In the example illustrated in FIG. 14, it can be evaluated that the production efficiency is the most excellent on the dump tracks 20g, 20h, 20i, and 20j where the points are positioned in the area A6, and it can be evaluated that the production efficiency is second excellent on the dump track 20f where the point is positioned in the areas A4 and A5 to the production efficiency of the dump track 20 where the point is positioned in the area A6. Moreover, it can be evaluated that the production efficiency is second excellent on the dump tracks 20b and 20e where the points are positioned in the areas A2 and A3 to the production efficiency of the dump track 20f where the point is positioned in the areas A4 and A5, and it can be evaluated that the production efficiency is the poorest on the dump tracks 20a, 20c, and 20d where the points are positioned in the area A1.

It is noted that the evaluation method according to the quadrants on the graph based on the two-dimensional graph illustrated in FIG. 14 is similar to the evaluation method illustrated in FIG. 9.

In the graph illustrated in FIG. 14, for example, it is evaluated that production efficiency is poor on the dump tracks 20 (20a, 20c, and 20d) where the points are positioned in the area A1 because the transport load is small although the amount of fuel consumed is large. Based on the data on the graph illustrated in FIG. 14, for example, it can be evaluated that the cause why the production efficiency of the dump track 20 is poor is resulted from the drive manipulation technique (the manipulation technique) of the operators of the dump tracks 20a, 20c, and 20d where the points are positioned in the area A1 or the vehicle states of the dump tracks 20a, 20c, and 20d.

In the graph illustrated in FIG. 14, for example, the dump track 20e where the point is positioned in the area A2 is evaluated that the amount of fuel consumed is small and the transport load is small as well. Based on the data on the graph illustrated in FIG. 14, for example, it is determined that the cause why the production efficiency of the dump track 20 is poor is resulted from a too-small loadage on the dump track 20e or a long down time of the dump track 20e, for example, so that the drive manipulation of the operator can be guided to improve the cause.

In the graph illustrated in FIG. 14, for example, the dump track 20b where the point is positioned in the area A3 is evaluated that the transport load is large and the amount of fuel consumed is large as well. Based on the data on the graph illustrated in FIG. 14, for example, it is determined that the cause why the production efficiency is poor is resulted from a too-large loadage of the load of the dump track 20b (the load is overloaded) or the drive manipulation technique (the manipulation technique) of the operator of the dump track 20b, so that the drive manipulation of the operator can be guided to improve the cause.

In the embodiment, from the graph illustrated in FIG. 14, for example, the manager can quickly and smoothly evaluate the superiority of the production efficiency for a plurality of the individual dump tracks 20 (simultaneous improvement of productivity and fuel consumption). For example, it can be quickly grasped what degree the indices of the production efficiency of a plurality of the individual dump tracks 20 are superior to the mean values of the indices of the production efficiency of a plurality of the dump tracks 20 (the origin point in the graph illustrated in FIG. 14) and the line LR indicating the evaluation reference. Moreover, whether the cause why the production efficiency of the dump track 20 is poor is resulted from the transport load or the amount of fuel consumed can be grasped at a glance, so that it is possible to quickly investigate schemes for solving the problem and conduct the schemes.

It is noted that based on the data on the graph illustrated in FIG. 14, the management side processor 12 may automatically evaluate the production efficiency of a plurality of the dump tracks 20. At this time, the evaluation result may be printed as an evaluation report out of the printing device 19.

It is noted that in the graph illustrated in FIG. 14, the vertical axis may express the transport load per unit time and the horizontal axis may express the amount of fuel consumed per unit time. In this case, the superiority of evaluation on the production efficiency of the quadrants of the two-dimensional graph is inverted to the example in FIG. 14 as the origin point is in the center.

It is noted that the content on the display illustrated in FIGS. 13 and 14 may be printed using the printing device 19. Namely, it may be fine that the evaluation described above is performed based on the graph outputted from the display device 16 or the printing device 19.

Figure 15:
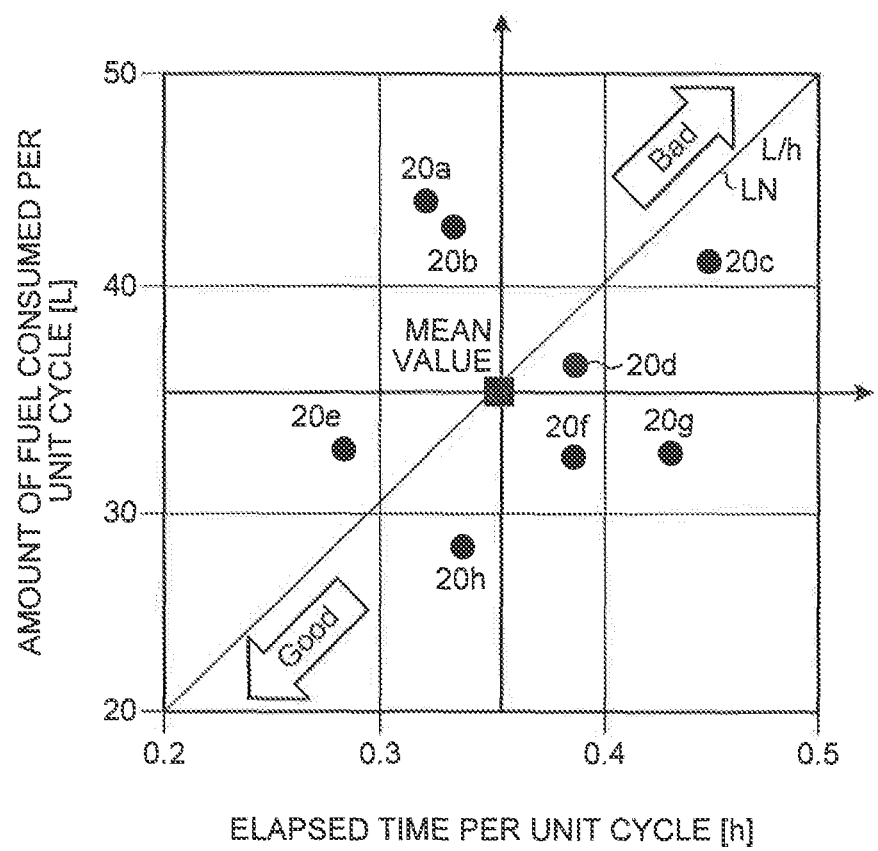
FIG. 15 is a diagram of an exemplary screen of the display device according to the embodiment.

Moreover, after the evaluation according to the graph in FIG. 9, the detailed evaluation may be performed on the route CS evaluated that it is necessary to improve the production efficiency (the production efficiency is the poorest, for example) in a plurality of the routes CS in order mainly to perform drive evaluation in consideration of fuel consumption and cycle time. FIG. 15 is an exemplary screen of the display device 16 according to the embodiment. In a two-dimensional graph illustrated in FIG. 15, the horizontal axis expresses the elapsed time per unit cycle, that is, the cycle time, and the vertical axis expresses the amount of fuel consumed per unit cycle. On the two-dimensional graph, for example, points indicating the mean values of the indices are plotted on the vertical axis and the horizontal axis on a plurality of the dump tracks 20 that has traveled on the traveling route of an evaluation target such as a route CS evaluated that the production efficiency is poor. Furthermore, on the two-dimensional graph, a line LN is displayed, which passes the point indicating the mean values of the indices is plotted on the vertical axis and the horizontal axis and indicates the amount of fuel consumed per unit time, that is, the line LN is average fuel consumption to be the reference to the drive evaluation.

On such two-dimensional graph, points are displayed, which indicate performance values of the indices on the vertical axis and the horizontal axis for plurality of the individual dump tracks 20a, 20b, 20c, 20d, 20e, 20f, 20g, and 20h. It can be evaluated that the drive of the dump tracks 20 corresponding to points plotted on a region below the line LN runs in excellent fuel consumption more than in average fuel consumption. Moreover, it can be evaluated that the dump tracks 20 in lower regions run in more excellent fuel consumption along the vertical axis direction. Furthermore, it can be evaluated that the dump tracks 20 in more left regions run excellently on the point of productivity in the horizontal axis direction because of a short cycle time.

On the two-dimensional graph illustrated in FIG. 15, traveling performance values may be plotted for individual the specific sections of the same route CS for the individual operators traveling on the same route CS. The evaluation is made based on the two-dimensional graph illustrated in FIG. 15, so that it can be easily evaluated at a glance which dump track runs in a poor fuel consumption, by whom operator runs poorly, and on which specific section the dump track runs poorly, for example, and driving methods can be appropriately evaluated.

<The Evaluation of Operation Information in the Specific Section of the Route>

Next, the detailed evaluation is performed on the dump track 20 which is evaluated that the production efficiency is poor. For an example, in the evaluation described with reference to FIG. 14, the detailed evaluation is performed on the dump track 20a which is evaluated that the production efficiency is the poorest. In the embodiment, similarly to the embodiment illustrated in FIGS. 11 and 12, the operation of the dump track 20a is evaluated in the specific sections SC of a single or a plurality of the routes CS on which the dump track 20a has traveled. The method for processing the evaluation is similar as in the embodiment illustrated in FIGS. 11 and 12, and the description is omitted here.

<The Evaluation of the Operation for a Plurality of Individual Work Periods>

The management side processor 12 may derive and evaluate the indices of the production efficiency of the dump track 20 for a plurality of the work periods individually. The indices of the production efficiency of the dump track 20 for a plurality of the individual work periods includes at least one of the amount of fuel consumed per unit time of the dump track 20 for a plurality of the individual work periods, the transport load per unit time, and the transport load per unit amount of fuel consumed.

For example, in the case where the dump track 20 operates in a first period Ta, a second period Tb, a third period Tc, a fourth period Td, and a fifth period Te, the management side processor 12 derives and evaluates the indices of the production efficiency of the dump track 20 in the first period Ta, the indices of the production efficiency of the dump track 20 in the second period Tb, the indices of the production efficiency of the dump track 20 in the third period Tc, the indices of the production efficiency of the dump track 20 in the fourth period Td, and the indices of the production efficiency of the dump track 20 in the fifth period Te. It is noted that the period T may be periods for seasons, or periods for months, for example.

Figure 16:
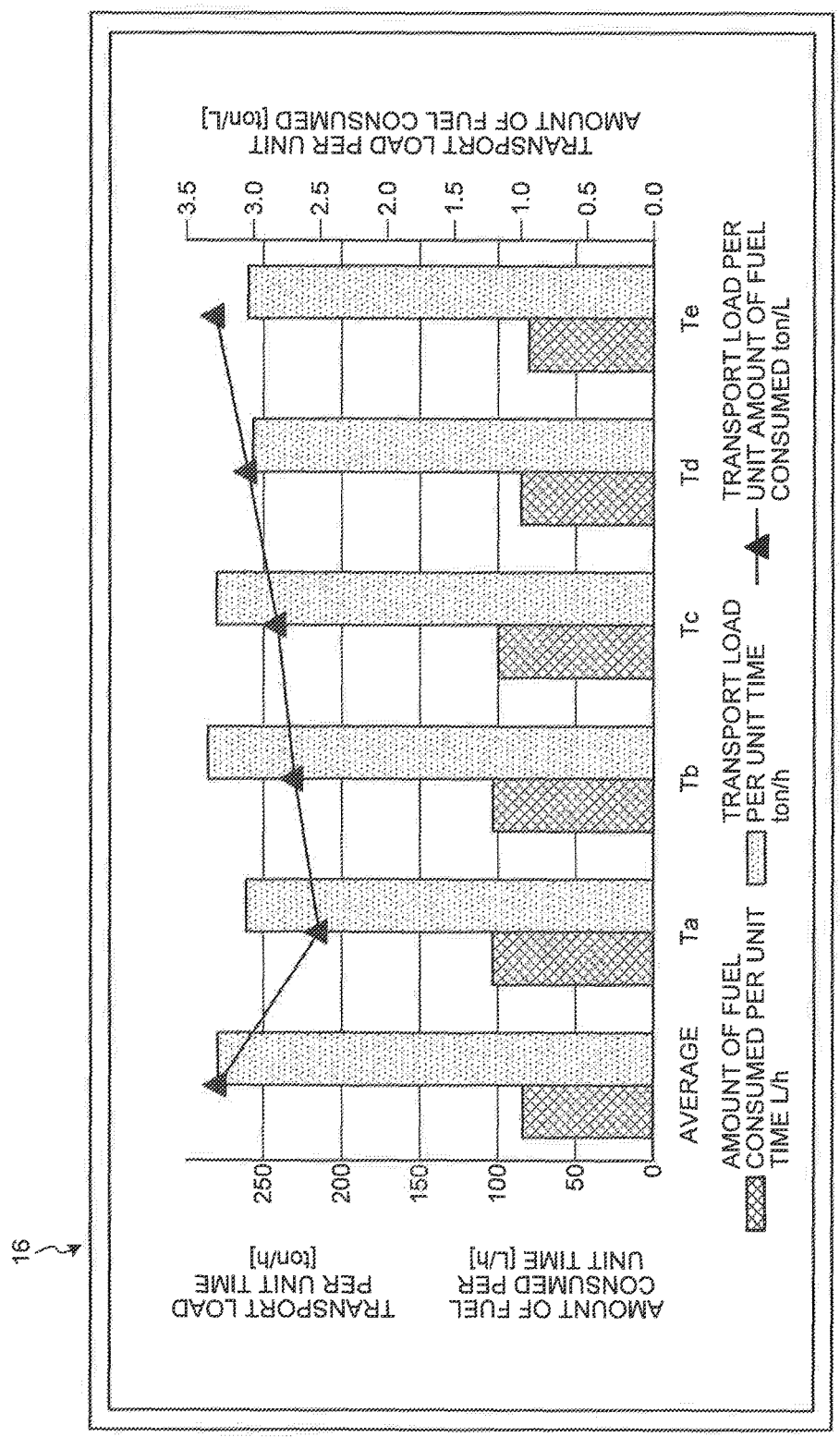
FIG. 16 is a diagram of an exemplary screen of the display device according to the embodiment.

FIG. 16 is an exemplary screen of the display device 16 according to the embodiment. As illustrated in FIG. 16, the display device 16 displays the indices of the production efficiency of the dump track 20 in association with a plurality of the periods Ta, Tb, Tc, Td, and Te. In the embodiment, the display device 16 displays the indices of the production efficiency of the dump track 20 in a graph (a bar graph and a line graph).

In the graph illustrated in FIG. 16, the vertical axis expresses the amount of fuel consumed per unit time (L/h) of the dump track 20, the transport load per unit time (ton/h), and the transport load per unit amount of fuel consumed (ton/L). Here, h expresses hours, L expresses liters, and ton expresses tons. The horizontal axis expresses a plurality of the periods Ta, Tb, Tc, Td, and Te and the mean value of a plurality of the periods T.

The numeric values of the graphs of a plurality of the periods Ta, Tb, Tc, Td, and Te may be the mean values of the indices of the dump track 20 in the cycles when the dump tracks 20 travel on the same route CS in a plurality of the individual periods T, or may be the mean value of the dump track 20 in the cycles for the individual routes CS when the dump track 20 travels on different routes CS. Moreover, the numeric value of the graph of the first period Ta may be the indices when the dump track 20 travels on the route CS once, for example, or may be the mean value when the dump track 20 travels on the same route CS for a plurality of times. The same thing is also applied to the second period Tb, the third period Tc, the fourth period Td, and the fifth period Te.

Figure 17:
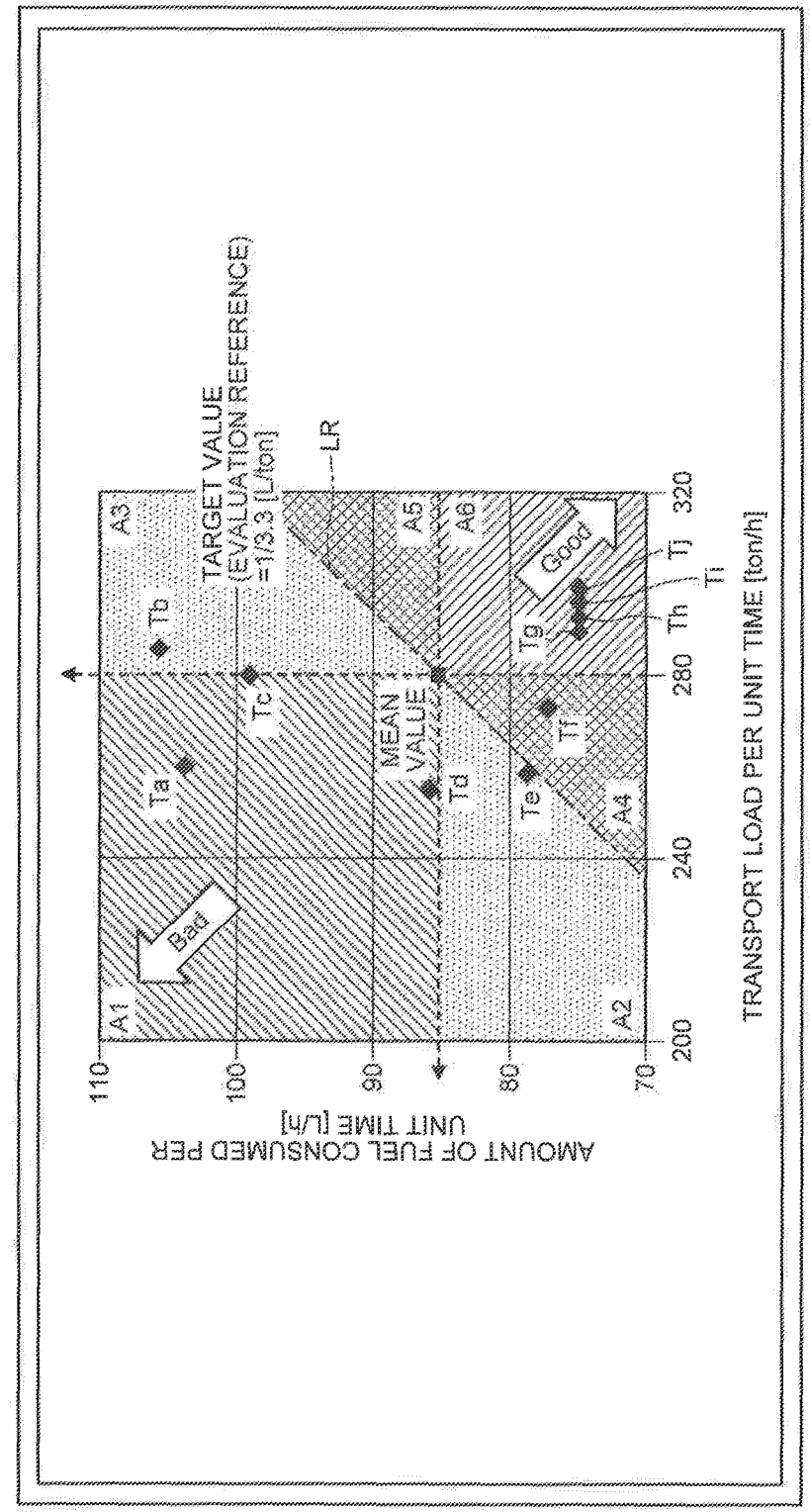
FIG. 17 is a diagram of an exemplary screen of the display device according to the embodiment.

FIG. 17 is an exemplary screen of the display device 16 according to the embodiment, illustrating other examples of indications of the indices of the production efficiency of the dump track 20. In the embodiment, an example is shown that the indices are displayed in association with a plurality of periods Ta, Tb, Tc, Td, Te, Tf, Tg, Th, Ti, and Tj.

It is noted that the image illustrated in FIG. 17 and the image illustrated in FIG. 16 may be displayed on the same display device 16, or may be individually displayed on different display devices 16. Moreover, the image illustrated in FIG. 17 and the image illustrated in FIG. 16 may be simultaneously displayed on the same display device 16, or may be displayed at different timings.

In FIG. 17, the display device 16 displays a two-dimensional graph, in which the vertical axis expresses the amount of fuel consumed per unit time, which is one of the indices of the production efficiency, the horizontal axis expresses the transport load per unit time, and the origin point expresses the mean values of the indices on the vertical axis and the horizontal axis for a plurality of the periods Ta, Tb, Tc, Td, Te, Tf, Tg, Th, Ti, and Tj. Namely, the origin point is a point expressing the mean value of the amount of fuel consumed per unit time and a point expressing the mean value of the transport load per unit time of the dump track 20 for a plurality of the periods Ta, Tb, Tc, Td, Te, Tf, Tg, Th, Ti, and Tj.

The two-dimensional graph illustrated in FIG. 17 displays a line LR indicating the transport load per unit amount of fuel consumed to be a reference of the evaluation of production efficiency and displays a plurality of points indicating the values of the indices on the vertical axis and the horizontal axis for a plurality of the periods Ta, Tb, Tc, Td, Te, Tf, Tg, Th, Ti, and Tj. The values of the indices at the points on the vertical axis and the horizontal axis are the mean value of the amount of fuel consumed per unit time (L/h) in the cycles in the periods T (Ta, Tb, Tc, Td, Te, Tf, Tg, Th, Ti, Tj) and the mean value of the transport load per unit time (ton/h) in the cycles of in the periods T.

The line LR is a linear line. In the embodiment, the line LR indicates the reciprocal (L/ton) of the transport load per unit amount of fuel consumed at the dump track 20. Namely, the line LR indicates the use amount of fuel consumed per unit transport load of the dump track 20. In the graph, the production efficiency of the dump track 20 is poorer as the inclination of the line LR is greater.

Based on the two-dimensional graph illustrated in FIG. 17, production efficiency is evaluated by evaluating the operation of the dump track 20 for a plurality of the individual periods T (Ta, Tb, Tc, Td, Te, Tf, Tg, Th, Ti, Tj). In the graph illustrated in FIG. 17, it is evaluated that production efficiency is highly excellent on the dump track 20 that has traveled in the period T having a performance in which a larger amount of a transport load is carried with a smaller amount of fuel consumed in a plurality of the periods T. Namely, in the graph illustrated in FIG. 17, it can be evaluated that production efficiency is excellent on the dump track 20 in the period T where the point is positioned in the areas A4, A5, and A6 on the lower side of the line LR. On the other hand, it can be evaluated that production efficiency is poor on the dump track 20 in the period T where the point is positioned in areas A1, A2, and A3 on the upper side of the line LR. In the example illustrated in FIG. 17, it can be evaluated that the production efficiency of the dump track 20 is the most excellent in the periods Tg, Th, Ti, and Tj where the points are positioned in the area A6, and it can be evaluated that the production efficiency of the dump track 20 is second excellent in the period Tf where the point is positioned in the areas A4 and A5 to the production efficiency of the dump tracks 20 in the period T where the points are positioned in the area A6. Moreover, it can be evaluated that the production efficiency of the dump track 20 is second excellent in the periods Tb and Te where the points are positioned in the areas A2 and A3 to in the period Tf where the point is positioned in the areas A4 and A5, and it can be evaluated that the production efficiency of the dump track 20 is the poorest in the periods Ta, Tc, and Td where the points are positioned in the area A1.

In the graph illustrated in FIG. 17, for example, it is evaluated that production efficiency is poor on the dump track 20 operating in the periods Ta, Tc, and Td positioned in the area A1 because the transport load is small although the amount of fuel consumed is large. Based on the data on the graph illustrated in FIG. 17, for example, it can be evaluated that the cause why the production efficiency of the dump track 20 is poor is resulted from the environment in the periods Ta, Tc, and Td (the temperature, the humidity, and the road surface state of the route, for example). Alternatively, it can be evaluated that the cause why the production efficiency of the dump track 20 is poor is resulted from the degradation of the vehicle state in the periods Ta, Tc, and Td because of the environment (that is, the vehicle performance is reduced).

In the embodiment, from the graph illustrated in FIG. 17, for example, the manager can quickly and smoothly evaluate the superiority of production efficiency of the dump track 20 for a plurality of the individual periods T. For example, it can be quickly grasped what degree the indices of the production efficiency of the dump track 20 are superior in a plurality of the individual periods T with respect to the mean values of the indices of the production efficiency of the dump track 20 in a plurality of the individual periods T (that is, the origin point in the graph illustrated in FIG. 17) and the line LR indicating the evaluation reference. Moreover, whether the cause why the production efficiency of the dump track 20 is poor is resulted from the transport load or the amount of fuel consumed can be grasped at a glance, so that it is possible to quickly investigate schemes for solving the problem and conduct the schemes.

It is noted that based on the data on the graph illustrated in FIG. 17, the management side processor 12 may automatically evaluate the production efficiency of the dump track 20 for a plurality of the individual periods T. At this time, the evaluation result may be printed as an evaluation report out of the printing device 19.

It is noted that in the graph illustrated in FIG. 17, the vertical axis may express the transport load per unit time and the horizontal axis may express the amount of fuel consumed per unit time. In this case, the superiority of evaluation on the production efficiency of the quadrants of the two-dimensional graph is inverted to the example in FIG. 9 as the origin point is in the center.

<The Evaluation of Operation Information in the Specific Section of the Route>

Next, the detailed evaluation is performed on the dump track 20 in the period T evaluated that the production efficiency is poor. For an example, in the evaluation described with reference to FIG. 17, the evaluation is performed on the dump track 20 in the period Ta which is evaluated that the production efficiency is the poorest. In the embodiment, similarly to the embodiment illustrated in FIGS. 11 and 12, the operation of the dump track 20 in the period Ta is evaluated in the specific section SC of one or a plurality of the routes CS on which one or a plurality of the dump tracks 20 travels. The method for processing the evaluation is similar as in the embodiment illustrated in FIGS. 11 and 12, and the description is omitted here.

<The Evaluation of the Operation for a Plurality of the Individual Specific Sections>

The management side processor 12 may derive and evaluate the indices of the production efficiency of the dump track 20 on a plurality of the individual specific sections included in a plurality of the routes. For example, in the case where in the mine, one or a plurality of the dump tracks 20 travels on a plurality of routes and a plurality of the routes includes a plurality of the specific sections, the management side processor 12 may derive and evaluate the indices of the production efficiency for individual specific sections SCa, SCb, SCc, SCd, and SCe. For example, the indices of the production efficiency includes the amount of fuel consumed per unit time, the transport load per unit time, and the transport load per unit amount of fuel consumed.

Figure 18:
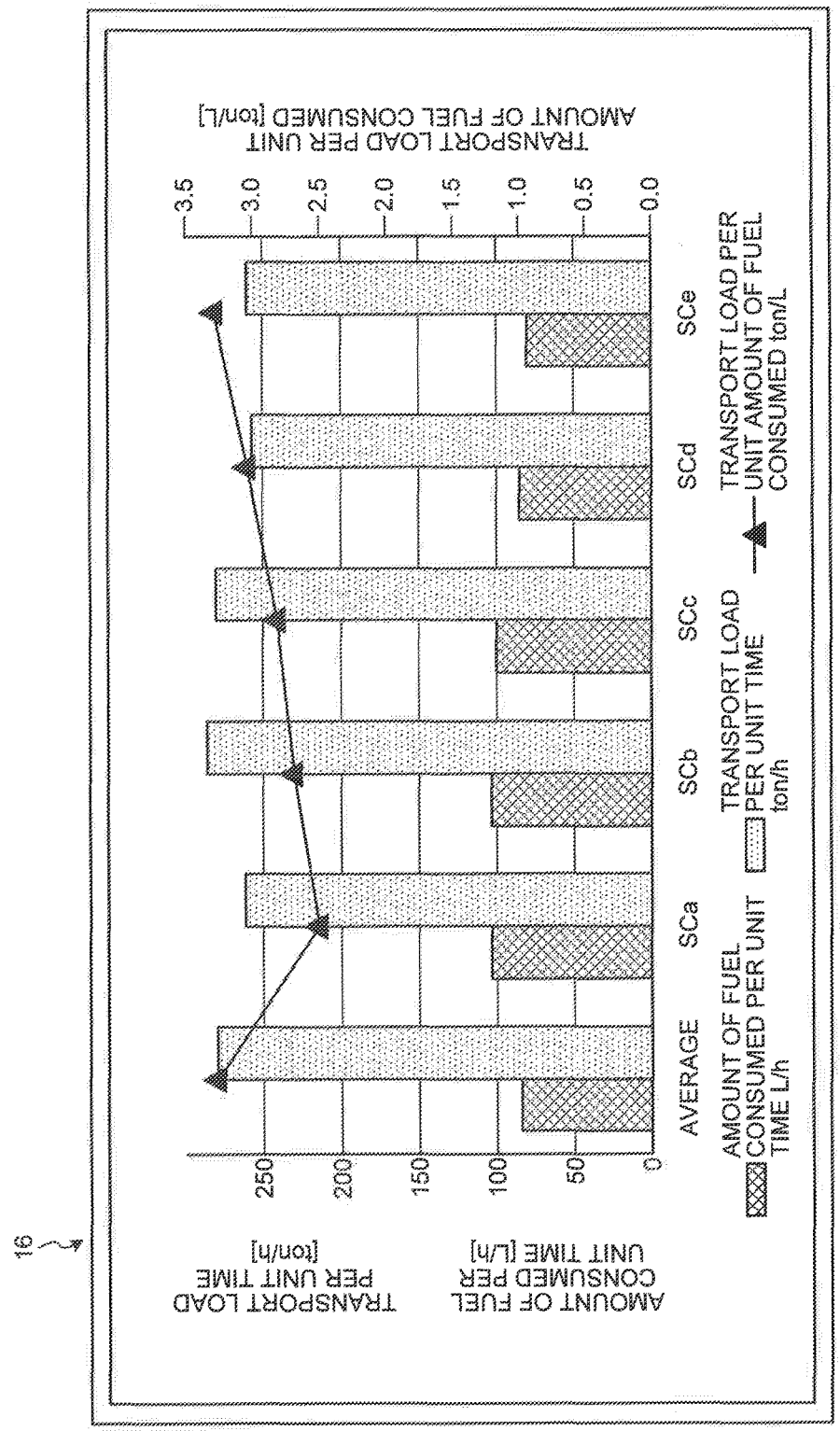
FIG. 18 is a diagram of an exemplary screen of the display device according to the embodiment.

FIG. 18 is an exemplary screen of the display device 16 according to the embodiment. In the example illustrated in FIG. 18, the indices of the production efficiency are displayed in association with a plurality of the specific sections SCa, SCb, SCc, SCd, and SCe. In the embodiment, the display device 16 displays the indices of the production efficiency in a graph (a bar graph and a line graph).

In the graph illustrated in FIG. 18, the vertical axis expresses the amount of fuel consumed per unit time (L/h) of the dump track 20, the transport load per unit time (ton/h), and the transport load per unit amount of fuel consumed (ton/L) in the specific sections SCa, SCb, SCc, SCd, and SCe. Here, h expresses hours, L expresses liters, and ton expresses tons. The horizontal axis expresses a plurality of the specific sections SCa, SCb, SCc, SCd, and SCe and the mean value of a plurality of the specific sections SC.

The numeric values of the indices of the specific sections SCa, SCb, SCc, SCd, and SCe on the graph may be the mean values of the indices of all the dump tracks 20 in the specific section SC in the individual cycles when one or a plurality of the dump tracks 20 travels on the same specific section SC, or may be the mean values of the indices of all the dump tracks 20 in the specific sections SCa, SCb, SCc, SCd, and SCe in the individual cycles when one or a plurality of the dump tracks 20 travels on a plurality of the specific sections SCa, SCb, SCc, SCd, and SCe.

Figure 19:
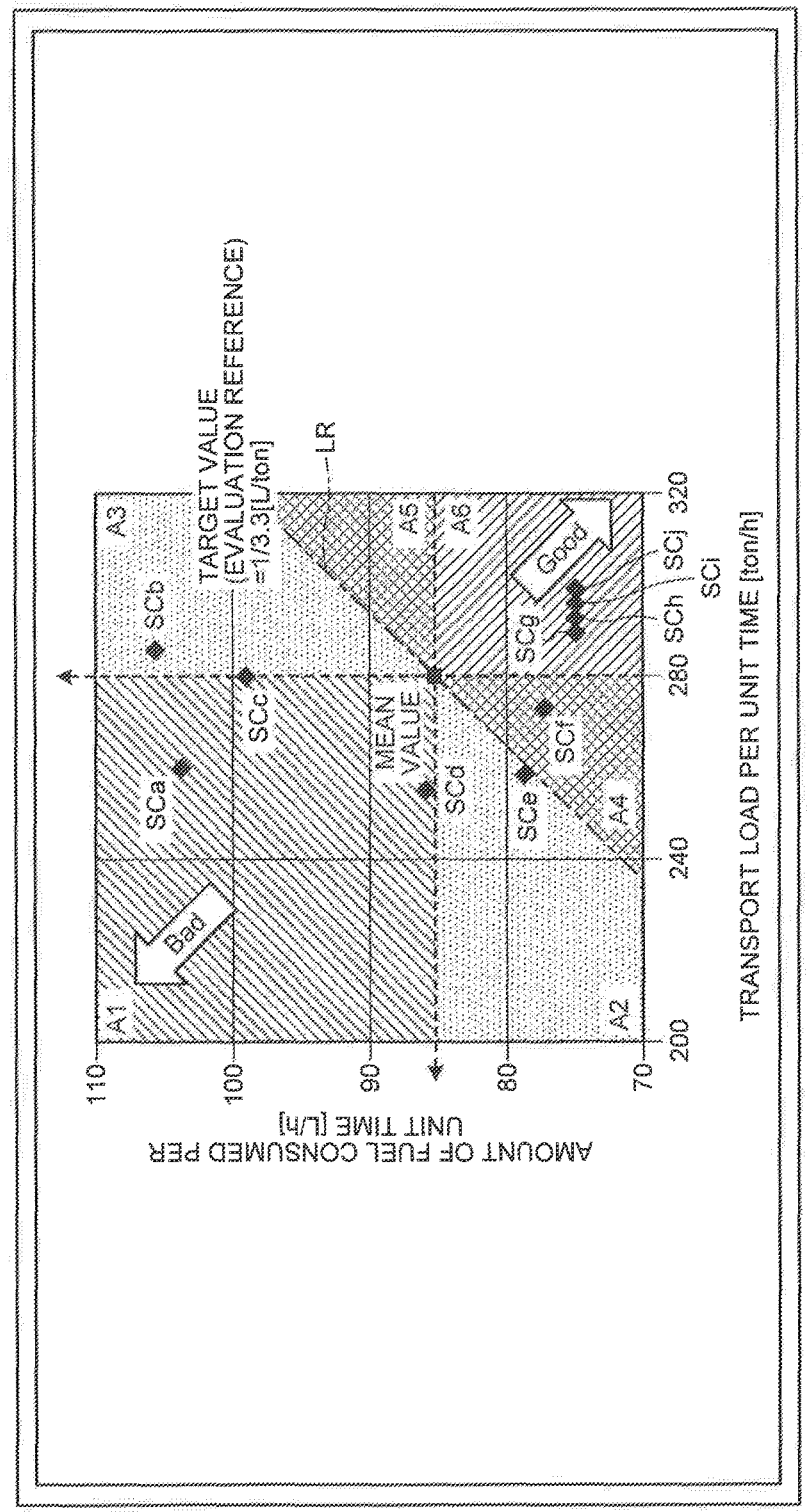
FIG. 19 is a diagram of an exemplary screen of the display device according to the embodiment.

FIG. 19 is an exemplary screen of the display device 16 according to the embodiment, illustrating another exemplary display of the indices of the production efficiency of the dump track 20. The indices are displayed in association with a plurality of specific sections SCa, SCb, SCc, SCd, SCe, SCf, SCg, SCh, SCi, and SCj.

It is noted that the image illustrated in FIG. 19 and the image illustrated in FIG. 18 may be displayed on the same display device 16, or may be individually displayed on different display devices 16. Moreover, the image illustrated in FIG. 19 and the image illustrated in FIG. 18 may be simultaneously displayed on the same display device 16, or may be displayed at different timings.

In FIG. 19, the display device 16 displays a two-dimensional graph, in which the vertical axis expresses the amount of fuel consumed per unit time, which is one of the indices of the production efficiency, the horizontal axis expresses the transport load per unit time, and the origin point expresses the mean values of the indices on the vertical axis and the horizontal axis for a plurality of the specific sections SCa, SCb, SCc, SCd, SCe, SCf, SCg, SCh, SCi, and SCj. Namely, the origin point is a point expressing the mean value of the amount of fuel consumed per unit time and a point expressing the mean value of the transport load per unit time for a plurality of the specific sections SCa, SCb, SCc, SCd, SCe, SCf, SCg, SCh, SCi, and SCj.

The two-dimensional graph illustrated in FIG. 19 displays a line LR indicating the transport load per unit amount of fuel consumed to be a reference of the evaluation of production efficiency and displays a plurality of points indicating the values of the indices on the vertical axis and the horizontal axis for a plurality of the specific sections SCa, SCb, SCc, SCd, SCe, SCf, SCg, SCh, SCi, and SCj. The values of the indices at the points on the vertical axis and the horizontal axis are the mean value of the amount of fuel consumed per unit time (L/h) of the dump track 20 in the cycles and the mean value of the transport load per unit time (ton/h) of the dump track 20 in the cycles for the corresponding specific sections SCa, SCb, SCc, SCd, SCe, SCf, SCg, SCh, SCi, and SCj.

Similarly to the example illustrated in FIG. 9, the line LR is a linear line, indicating the reciprocal (L/ton) of the transport load per unit amount of fuel consumed at the dump track 20. Namely, the line LR indicates the amount of fuel consumed per unit transport load of the dump track 20. In the graph, the production efficiency of the dump track 20 is poorer as the inclination of the line LR is greater.

Based on the two-dimensional graph illustrated in FIG. 19, production efficiency is evaluated by operation evaluation for a plurality of the individual specific sections SCa, SCb, SCc, SCd, SCe, SCf, SCg, SCh, SCi, and SCj. In the graph illustrated in FIG. 19, it is evaluated that the production efficiency is highly excellent in the specific section having a performance in which a larger amount of a transport load is carried with a smaller amount of fuel consumed in a plurality of the specific sections SCa, SCb, SCc, SCd, SCe, SCf, SCg, SCh, SCi, and SCj. Namely, it can be evaluated that production efficiency of the dump track 20 is excellent in the specific section where the point is positioned in the areas A4, A5, and A6 on the lower side of the line LR. On the other hand, it can be evaluated that the production efficiency is poor in the specific section where the point is positioned in areas A1, A2, and A3 on the upper side of the line LR. In the example illustrated in FIG. 19, it can be evaluated that the production efficiency of the dump track 20 is the most excellent in the specific sections SCg, SCh, SCi, and SCj where the points are positioned in the area A6, and it can be evaluated that the production efficiency of the dump track 20 is second excellent in the specific section SCf where the point is positioned in the areas A4 and A5 to the production efficiency of the dump track 20 in the specific sections SCg, SCh, SCi, and SCj where the points are positioned in the area A6. Moreover, it can be evaluated that the production efficiency of the dump track 20 is second excellent in the specific sections SCb and SCe where the points are positioned in the areas A2 and A3 to the production efficiency of the dump track 20 in the specific section SCf where the points are positioned in the areas A4 and A5, and it can be evaluated that the production efficiency of the dump track 20 is the poorest in the specific sections SCa, SCc, and SCd where the point is positioned in the area A1.

It is noted that the evaluation method according to the quadrants on the graph based on the two-dimensional graph illustrated in FIG. 19 is similar to the evaluation method illustrated in FIG. 9.

In the graph illustrated in FIG. 19, for example, it is evaluated that production efficiency of the dump track 20 is poor in the specific sections SCa, SCc, and SCd where the point is positioned in the area A1 because the transport load is small although the amount of fuel consumed is large. Based on the data, for example, it is evaluated that the cause why the production efficiency of the dump track 20 is poor in the specific sections SCa, SCc, and SCd is possibly resulted from a faulty road surface state in the specific sections SCa, SCc, and SCd (the road surface is slippery and the irregularity of the road surface is great, for example). Therefore, the traveling speed and the tilt angle of the car body, for example, in the specific sections SCa, SCc, and SCd are investigated in detail based on different items of operation information for evaluation whether the cause is a faulty road surface state or a different cause.

In the graph illustrated in FIG. 19, for example, the dump track 20 in the specific section SCe where the point is positioned in the area A2 is evaluated that the amount of fuel consumed is small and the transport load is small as well. Based on the data, for example, it is evaluated that the cause why the production efficiency of the dump track 20 is poor in the specific section SCe is possibly resulted from a too-small loadage, a long down time, and a slow traveling speed. Therefore, the loadage, the stoppage time, and the traveling speed, for example, in traveling on the specific section SCe are investigated in detail based on different items of operation information. When it is revealed that this is the cause, the drive manipulation of the operator can be guided to improve the cause.

In the graph illustrated in FIG. 19, for example, the dump track 20 in the specific section SCb where the point is positioned in the area A3 is evaluated that the transport load is large and the amount of fuel consumed is large as well. Based on the data, for example, it is evaluated that the cause why the production efficiency of the dump track 20 in the specific section SCb is poor is possibly resulted from a too-large loadage (that is, a load is overloaded), traveling speed excessively faster than the prescribed speed, or excessively frequent quick accelerations and quick decelerations. Therefore, the traveling speed, the extent and frequency of accelerations and decelerations, for example, in traveling on the specific section SCb are investigated in detail based on different items of operation information. When it is revealed that this is the cause, the drive manipulation of the operator can be guided to improve the cause.

In the embodiment, from the graph illustrated in FIG. 19, for example, the manager can quickly and smoothly evaluate the superiority of production efficiency for a plurality of the individual specific sections. For example, it can be quickly grasped what degree the indices of the production efficiency of a plurality of the specific sections are superior to the mean values of the indices of the production efficiency in a plurality of the specific sections (the origin point in the graph illustrated in FIG. 19) and the line LR indicating the evaluation reference. Moreover, whether the cause why the production efficiency is poor in a certain specific section is resulted from the transport load or the amount of fuel consumed can be grasped at a glance, so that it is possible to quickly investigate schemes for solving the problem and conduct the schemes.

It is noted that based on the data on the graph illustrated in FIG. 19, the management side processor 12 may automatically evaluate the production efficiency of the dump track 20 for a plurality of the individual specific sections. At this time, the evaluation result may be printed as an evaluation report out of the printing device 19.

It is noted that in the graph illustrated in FIG. 19, the vertical axis may express the transport load per unit time and the horizontal axis may express the amount of fuel consumed per unit time. In this case, the superiority of evaluation on the production efficiency of the quadrants of the two-dimensional graph is inverted to the example in FIG. 19 as the origin point is in the center.

It is noted that the content on the display illustrated in FIGS. 15, 16, 17, 18, and 19 may be printed using the printing device 19. Namely, it may be fine that the evaluation described above is performed based on the graph outputted from the display device 16 or the printing device 19.

As described above, according to the embodiment, operation information about the dump track 20 in the specific section SC is evaluated, so that it is possible to appropriately evaluate the operation information about the dump track 20 on the route CS. Moreover, according to the embodiment, it is possible to appropriately evaluate the operation state of the dump track 20 in the specific section SC based on the operation information. Furthermore, the operation information is displayed in association with the specific section SC on the display device 16, so that it is possible to quickly and appropriately grasp what event occurs on which specific section SC in the route. Therefore, for example, even in the case where a trouble occurs in the dump track 20, it is possible to quickly acquire information about the trouble for evaluation, and to take measures for solving the trouble.

Moreover, according to the embodiment, operation information about the dump track 20 (the indices of the production efficiency) is derived and evaluated for a plurality of the individual routes CS, so that it is possible to appropriately determine of which dump track 20 the production efficiency is degraded on which route CS in a plurality of the routes CS. Furthermore, it is possible to take appropriate measures for suppressing a reduction in the production efficiency.

In addition, according to the embodiment, operation information about the dump track 20 (the indices of the production efficiency) is derived and evaluated for a plurality of the individual dump tracks 20, so that it is possible to appropriately determine of which dump track 20 the production efficiency is degraded in a plurality of the dump tracks 20. Moreover, it is possible to take appropriate measures for suppressing a reduction in the production efficiency.

Furthermore, according to the embodiment, operation information about the dump track 20 (the indices of the production efficiency) is derived and evaluated for a plurality of the individual periods, so that it is possible to appropriately determine of which dump track 20 the production efficiency is degraded in which period in a plurality of the periods. In addition, it is possible to take appropriate measures for suppressing a reduction in the production efficiency.

Moreover, in the embodiment, the two-dimensional graph described with reference to FIGS. 9, 14, 17, and 19 is displayed on the display device 16, so that for example, the manager can easily evaluate the indices of the production efficiency of the dump track 20 at a glance based on the display on the display device 16. For example, it is possible to grasp the superiority of operation information about the dump track 20 (the indices of the production efficiency) at a glance with respect to the origin point on the two-dimensional graph (the mean values of the indices for production efficiency) and the evaluation reference line passing this origin point. Furthermore, it is possible to grasp at a glance whether the cause why the production efficiency of the dump track 20 is poor is resulted from the transport load per unit time or the amount of fuel consumed per unit time.

It is noted that in the foregoing embodiment, the evaluation of operation information may be performed by the manager, for example, may be performed at the management side processor 12, or may be performed at the on-vehicle processor 30.

It is noted that in the foregoing embodiment, a positioning satellite different from the GPS satellite may be used for detecting position information about the dump track 20. For example, positioning is performed by the GNSS (Global Navigation Satellite System), and position information about the dump track 20 is detected.

The configurations and elements of the foregoing embodiment include ones that a person skilled in the art can easily conceive, ones substantially the same, and so-called equivalents. Moreover, the configurations and elements of the foregoing embodiment can be appropriately combined. Furthermore, a part of the components is not sometimes used.

REFERENCE SIGNS LIST

1 MANAGEMENT SYSTEM
4 LOADER
10 MANAGEMENT APPARATUS
12 MANAGEMENT SIDE PROCESSOR
13 MANAGEMENT SIDE STORAGE DEVICE
18 MANAGEMENT SIDE WIRELESS COMMUNICATION DEVICE
20 DUMP TRACK
25 ROTATION SENSOR
26 PRESSURE SENSOR
28 ON-VEHICLE WIRELESS COMMUNICATION DEVICE
29 POSITION INFORMATION DETECTOR
30 ON-VEHICLE PROCESSOR
31 ON-VEHICLE STORAGE DEVICE
40 OPERATION INFORMATION DETECTOR
CS REGISTERED ROUTE
CSr ACTUAL TRAVELING ROUTE
LK LINK
PI POSITION INFORMATION
SC SPECIFIC SECTION
WP PASSAGE POSITION

The invention claimed is:
1. A management system of a mining machine comprising:
a position information detector which is mounted on a mining machine enabled to travel on a route in a mine and detects position information about the mining machine;
an operation information detector which is mounted on the mining machine and detects operation information about the mining machine; and
a first evaluation device which evaluates the operation information based on the position information and the operation information,
wherein the route in the mine includes a plurality of nodes disposed at a predetermined distance and a plurality of links connecting between the nodes adjacent to each other, and includes route information including a specific section in which a difference in a gradient between the links adjacent to each other is a predetermined value or less, a difference in an orientation between the links adjacent to each other is a predetermined value or less, and no intersection exists between the links adjacent to each other,
wherein the first evaluation device evaluates the operation information in the specific section of the route,
wherein the route includes a plurality of specific sections, wherein the management system comprises a second evaluation device which evaluates an index of production efficiency of the mining machine including an amount of fuel consumed per unit time and a transport load per unit time of the mining machine in each of the plurality of specific sections, wherein the second evaluation device generates two reference axes of a two-dimensional graph which indicate the amount of fuel consumed per unit time and the transport load per unit time of the index respectively and a mean value of the indexes of the plurality of specific sections, wherein the management system further comprises a second output device which outputs the index in association with each of the plurality of specific sections, wherein the second output device outputs the index as the two-dimensional graph in which one of the two axes is a vertical axis, the other is a horizontal axis, and the mean value of the indexes of the plurality of specific sections is an origin point, wherein the second output device outputs a line indicating the transport load per unit amount of fuel consumed to be an evaluation reference and a point indicating the index of each of the plurality of specific sections to the two-dimensional graph, and wherein operation of the mining machine is managed in light of the information from the two-dimensional graph to improve production efficiency of the mining machine including an amount of fuel consumed per unit time and a transport load per unit time of the mining machine.

2. A management system of a mining machine comprising:

a position information detector which is mounted on a mining machine enabled to travel on a route in a mine and detects position information about the mining machine;

an operation information detector which is mounted on the mining machine and detects operation information about the mining machine; and a first evaluation device which evaluates the operation information based on the position information and the operation information, wherein the route in the mine includes a plurality of nodes disposed at a predetermined distance and a plurality of links connecting between the nodes adjacent to each other, and includes route information including a specific section in which a difference in a gradient between the links adjacent to each other is a predetermined value or less, a difference in an orientation between the links adjacent to each other is a predetermined value or less, and no intersection exists between the links adjacent to each other, wherein the first evaluation device evaluates the operation information in the specific section of the route, wherein the route includes a plurality of routes, wherein the management system comprises a second evaluation device which evaluates an index of production efficiency of the mining machine including an amount of fuel consumed per unit time and a transport load per unit time of the mining machine in each of the plurality of routes, wherein the second evaluation device generates two reference axes of a two-dimensional graph which indicate the amount of fuel consumed per unit time and the transport load per unit time of the index respectively and a mean value of the indexes of the plurality of routes, wherein the management system further comprises a second output device which outputs the index in association with each of the plurality of routes, wherein the second output device outputs the index as the two-dimensional graph in which one of the two axes is a vertical axis, the other is a horizontal axis, and the mean value of the indexes of the plurality of routes is an origin point, wherein the second output device outputs a line indicating the transport load per unit amount of fuel consumed to be an evaluation reference and a point indicating the index of each of the plurality of routes to the two-dimensional graph, and wherein operation of the mining machine is managed in light of the information from the two-dimensional graph to improve production efficiency of the mining machine including an amount of fuel consumed per unit time and a transport load per unit time of the mining machine.

3. The management system of a mining machine according to claim 2, comprising a second evaluation device which evaluates an index of production efficiency including an amount of fuel consumed per unit time and a transport load per unit time of each of the plurality of mining machines.

4. The management system of a mining machine according to claim 3, comprising a second output device which outputs the index in association with each of the plurality of mining machines.

* * * * *